United States Patent
Pein et al.

(10) Patent No.: US 9,810,578 B2
(45) Date of Patent: Nov. 7, 2017

(54) SYSTEMS, METHODS, AND APPARATUS FOR RADIATION DETECTION

(71) Applicants: Brandt Christopher Pein, Cambridge, MA (US); Harold Young Hwang, Cambridge, MA (US); Wendi Chang, Annandale, VA (US); Keith A. Nelson, Newton, MA (US); Vladimir Bulovic, Lexington, MA (US); Nathaniel C. Brandt, Minneapolis, MN (US)

(72) Inventors: Brandt Christopher Pein, Cambridge, MA (US); Harold Young Hwang, Cambridge, MA (US); Wendi Chang, Annandale, VA (US); Keith A. Nelson, Newton, MA (US); Vladimir Bulovic, Lexington, MA (US); Nathaniel C. Brandt, Minneapolis, MN (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/061,308

(22) Filed: Mar. 4, 2016

(65) Prior Publication Data

US 2016/0258807 A1 Sep. 8, 2016

Related U.S. Application Data

(60) Provisional application No. 62/129,105, filed on Mar. 6, 2015, provisional application No. 62/201,274, filed
(Continued)

(51) Int. Cl.
*G01J 1/42* (2006.01)
*G01J 1/58* (2006.01)
(Continued)

(52) U.S. Cl.
CPC .............. *G01J 5/046* (2013.01); *G01J 1/58* (2013.01); *G01J 3/0216* (2013.01);
(Continued)

(58) Field of Classification Search
CPC ..................................... G01J 1/0407
See application file for complete search history.

(56) References Cited

U.S. PATENT DOCUMENTS

| | | |
|---|---|---|
| 5,514,878 A | 5/1996 | Holmes et al. |
| 8,710,444 B2 | 4/2014 | Kim et al. |

(Continued)

FOREIGN PATENT DOCUMENTS

| | | | | |
|---|---|---|---|---|
| DE | WO 2014067922 A1 * | 5/2014 | ............... | G07D 7/00 |
| WO | WO 2008/054846 | 5/2008 | | |

(Continued)

OTHER PUBLICATIONS

Akyildiz, I. F. et al., Terahertz band: Next frontier for wireless communications. *Phys. Commun.*12, 16-32 (2014).
(Continued)

*Primary Examiner* — Casey Bryant
*Assistant Examiner* — Jeremy S Valentiner
(74) *Attorney, Agent, or Firm* — Cooley LLP

(57) ABSTRACT

A radiation detection technique employs field enhancing structures and electroluminescent materials to converts incident Terahertz (THz) radiation into visible light and/or infrared light. In this technique, the field-enhancing structures, such as split ring resonators or micro-slits, enhances the electric field of incoming THz light within a local area, where the electroluminescent material is applied. The enhanced electric field then induces the electroluminescent material to emit visible and/or infrared light via electroluminescent process. A detector such as avalanche photodiode can detect and measure the emitted light. This technique
(Continued)

allows cost-effective detection of THz radiation at room temperatures.

26 Claims, 29 Drawing Sheets

Related U.S. Application Data on Aug. 5, 2015, provisional application No. 62/216,583, filed on Sep. 10, 2015.

(51) Int. Cl.
| | |
|---|---|
| G01J 5/04 | (2006.01) |
| G01J 3/02 | (2006.01) |
| G01J 5/08 | (2006.01) |
| G01J 3/04 | (2006.01) |
| G01J 3/42 | (2006.01) |

(52) U.S. Cl.
CPC .............. *G01J 3/0245* (2013.01); *G01J 3/04* (2013.01); *G01J 3/42* (2013.01); *G01J 5/0815* (2013.01); *G01J 5/0837* (2013.01)

(56) References Cited

U.S. PATENT DOCUMENTS

| | | | |
|---|---|---|---|
| 8,836,439 | B2 | 9/2014 | O'Hara et al. |
| 8,841,635 | B2 | 9/2014 | Bergeron |
| 9,000,376 | B2 | 4/2015 | Hwang et al. |
| 2002/0180348 | A1 | 12/2002 | Oda et al. |
| 2006/0152412 | A1 | 7/2006 | Evans et al. |
| 2006/0170331 | A1 | 8/2006 | Bertram et al. |
| 2010/0078559 | A1* | 4/2010 | Szeles .................. G01T 1/00 250/338.4 |
| 2012/0019901 | A1 | 1/2012 | Mazumder |
| 2013/0134309 | A1* | 5/2013 | Rapaport .............. G02F 1/3556 250/330 |
| 2013/0341529 | A1* | 12/2013 | Bergeron ............. C09K 11/574 250/483.1 |
| 2014/0008642 | A1* | 1/2014 | Morita ................ H01L 51/0004 257/40 |
| 2014/0061469 | A1* | 3/2014 | Hwang .................... G01J 5/28 250/338.4 |
| 2015/0294177 | A1* | 10/2015 | Paeschke ................ G07D 7/00 382/165 |

FOREIGN PATENT DOCUMENTS

| | | |
|---|---|---|
| WO | WO 2014/067922 | 5/2014 |
| WO | WO 2015/028029 A1 | 3/2015 |

OTHER PUBLICATIONS

Al-Naib, I. et al. Effect of local field enhancement on the nonlinear terahertz response of a silicon-based metamaterial. *Phys. Rev.* B88, 195203, 8 pp., (2013).

Bozyigit, D. et al., Study of field driven electroluminescence in colloidal quantum dot solids. *J. Appl. Phys.* 111, 113701, 7 pp. (2012).

Chan, W. L. et al., Imaging with terahertz radiation. *Reports Prog. Phys.*70, 1325-1379 (2007).

Ding, S.-H., et al., High-resolution terahertz reflective imaging and image restoration. *Appl. Opt.* 49, 6834-9 (2010).

Driscoll, T. et al., Dynamic tuning of an infrared hybrid-metamaterial resonance using vanadium dioxide. *Appl. Phys. Lett.* 93, 024101, 3 pp. (2008).

Fan, K. et al., Nonlinear Terahertz Metamaterials via Field-Enhanced Carrier Dynamics in GaAs. *Phys. Rev. Lett.*110, 217404, 5 pp. (2013).

Fan, S. et al., The growth of biomedical terahertz research. *J. Phys. D. Appl. Phys.*47, 374009, 11 pp. (2014).

Ginger, D. S. et al., Charge injection and transport in films of CdSe nanocrystals. *J. Appl. Phys.* 87, 1361-1368 (2000).

He, H. et al., Fabrication of porous Ag hollow sphere arrays based on coated template-plasma bombardment. *Nanotechnology* 24, 465302, 8 pp. (2013).

Hernandez-Serrano, A. I. et al., Quality control of leather by terahertz time-domain spectroscopy. *Appl. Opt.* 53, 7872-6 (2014).

Hirori, H. et al., Extraordinary carrier multiplication gated by a picosecond electric field pulse. Nature Communications, 2, Article No. 594, 6 pp. (2011).

Hoffmann, M. C. et al., Terahertz electro-absorption effect enabling femtosecond all-optical switching in semiconductor quantum dots. *Appl. Phys. Lett.* 97, 231108, 3 pp. (2010).

Hsieh, B.-Y. et al., Extraordinary interaction of terahertz and infrared waves through metallic nano-slits. In *IEEE Photonic Society 24th Annual Meeting* 9-10 (IEEE, 2011). doi:10.1109/PHO.2011.6110399.

Huck, C. et al., Plasmonic Enhancement of Infrared Vibrational Signals: Nanoslits versus Nanorods.*ACS Photonics* 2, 1489-97 (2015).

Iwaszczuk, K. et al., Nitrogen plasma formation through terahertz-induced ultrafast electron field emission. *Optica* 2,116-123 (2015).

Katsarakis, N. et al., Electric coupling to the magnetic resonance of split ring resonators. *Appl. Phys. Lett.* 84, 2943-2945 (2004).

Keiser, G. R. et al., Structural control of metamaterial oscillator strength and electric field enhancement at terahertz frequencies, *Applied Physics Letters* ,105(8), 081112.

Kepler, R. G. et al., Electron and hole mobility in tris(8-hydroxyquinolinato-N1,O8) aluminum. *Appl. Phys. Lett.* 66, 3618-3620 (1995).

Lange, C. et al., Extremely nonperturbative nonlinearities in GaAs driven by atomically strong terahertz fields in gold metamaterials. *Phys. Rev. Lett.* 113, 227401, 6 pp. (2014).

Lin, T.-H. et al., Electrochemical SERS at Periodic Metallic Nanopyramid Arrays. *J. Phys. Chem. C* 113, 1367-1372 (2009).

Link, S. et al., Shape and size dependence of radiative, non-radiative and photothermal properties of gold nanocrystals. *Int. Rev. Phys. Chem.*, 409-453 (2010).

Liu, H.-B. et al., Detection and identification of explosive RDX by THz diffuse reflection spectroscopy. *Opt. Express* 14, 415-423 (2006).

Liu, M. et al., Terahertz-field-induced insulator-to-metal transition in vanadium dioxide metamaterial. *Nature* 487, 345-8 (2012).

Malliaras, G. G. et al., Nondispersive electron transport in Alq3. *Appl. Phys. Lett.* 79, 2582-2584 (2001).

Martin, R. L. et al., Molecular and solid-state properties of tris-(8-hydroxyquinolate)-aluminum. *Phys. Rev. B* 61, 15804-15811 (2000).

Minowa, Y. et al., Evaluation of effective electric permittivity and magnetic permeability in metamaterial slabs by terahertz time-domain spectroscopy. *Opt. Express* 16, 4785-4796 (2008).

Novitsky, A. et al., Non-resonant terahertz field enhancement in periodically arranged nanoslits. *J. Appl. Phys.*112, 074318, 10 pp. (2012).

Popov, V.V., Plasmon Excitation and Plasmonic Detection of Terahertz Radiation in the Grating-Gate Field-Effect-Transistor Structures, *J. Infrared Milli Terahz Waves* 32, 1178-1191, (2011).

Rutz, F. et al., Terahertz quality control of polymeric products. *Int. J. Infrared Millimeter Waves* 27, 547-556 (2007).

Seo, M. A. et al., Terahertz field enhancement by ametallic nano slit operating beyond the skin-depth limit *Nature Photonics* 3, 152-156 (2009).

Talapin, D. V. et al., PbSe nanocrystal solids for n- and p-channel thin film field-effect transistors. *Science* 310, 86-9 (2005).

Tang, C. W. et al., Organic electroluminescent diodes. *Appl. Phys. Lett.* 51, 913-915 (1987).

Tarekegne, A. T. et al., Impact ionization in high resistivity silicon induced by an intense terahertz field enhanced by an antenna array. *New J. Phys.*17, 043002, 9 pp. (2015).

(56) References Cited

OTHER PUBLICATIONS

Tse, S. C. et al., Electron transit time and reliable mobility measurements from thick film hydroxyquinoline-based organic light-emitting diode. *J. Appl. Phys.* 94, 2033-2037 (2003).
Wood, V. et al., Electroluminescence from nanoscale materials via field-driven ionization. *Nano Lett.* 11, 2927-32 (2011).
Wood, V. et al., Alternating current driven electroluminescence from ZnSe/ZnS:Mn/ZnS nanocrystals. *Nano Lett.* 9, 2367-71 (2009).
Yu, D. et al., n-Type conducting CdSe nanocrystal solids. *Science* 300, 1277-80 (2003).
Zhao, J. et al., Terahertz imaging with sub-wavelength resolution by femtosecond laser filament in air. *Sci. Rep.* 4, 3880, 10 pp. (2014).
Reimer et al., "Single Photon Emission and Detection at the Nanoscale Utilizing Semiconductor Nanowires," SPIE, Journal of Nanophotonics, vol. 5, pp. 053502-1-053502-12, Mar. 29, 2011.
International Search Report and Written Opinion issued by the International Searching Authority for International Application No. PCT/US2016/20948, dated Jul. 29, 2016, 11 pages.

\* cited by examiner

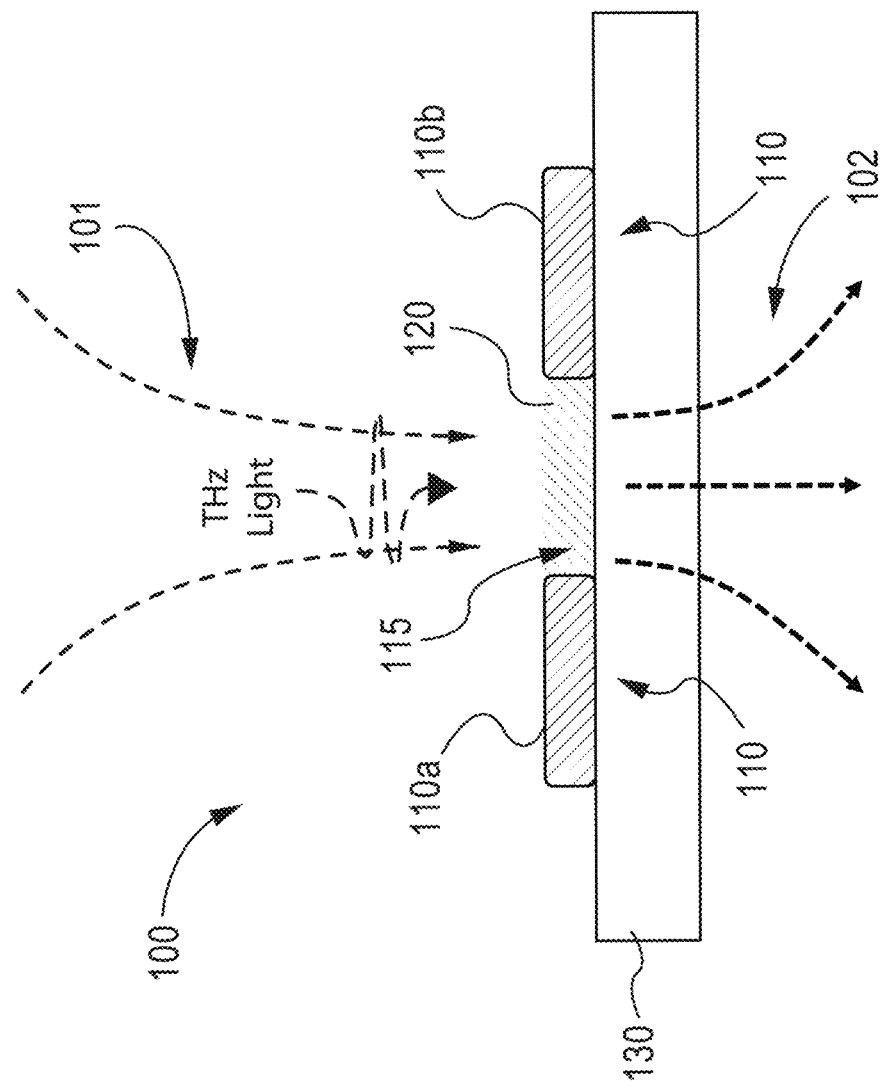

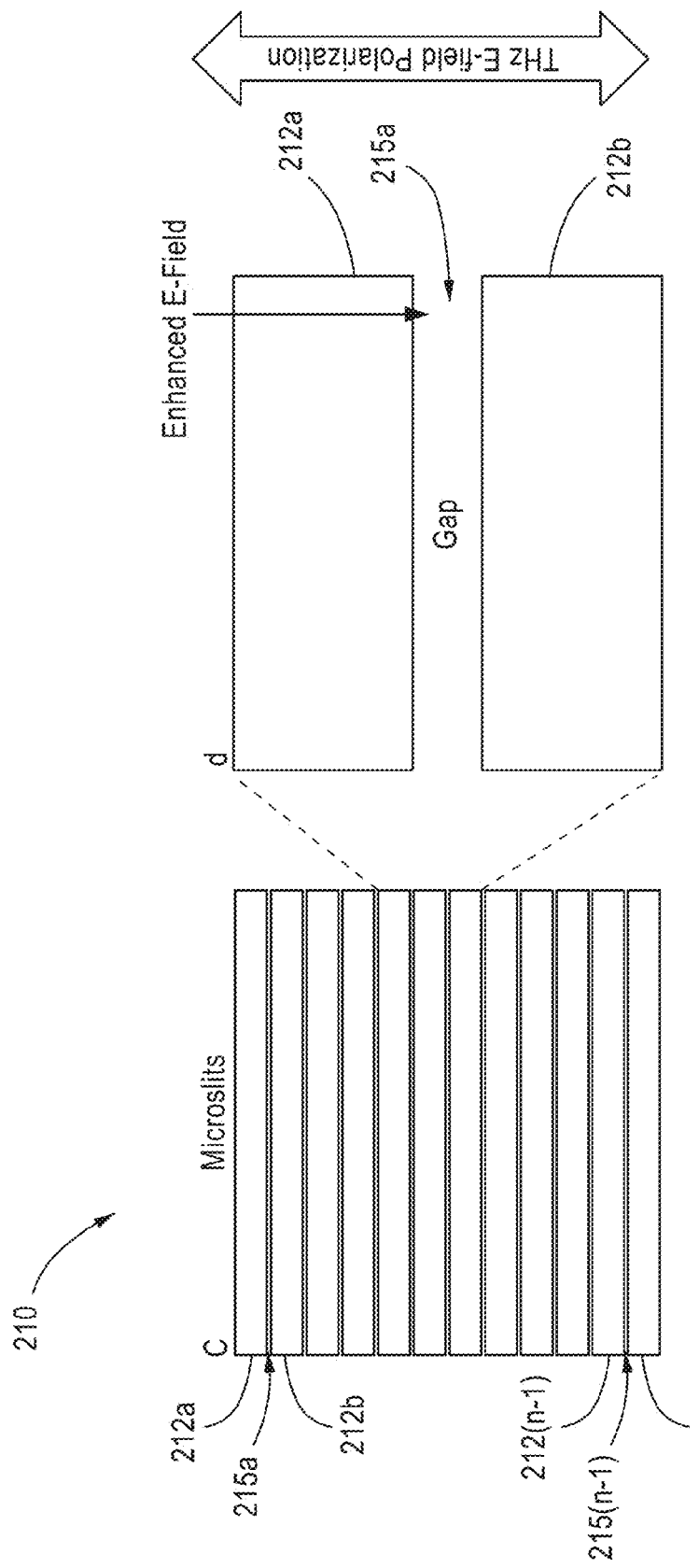

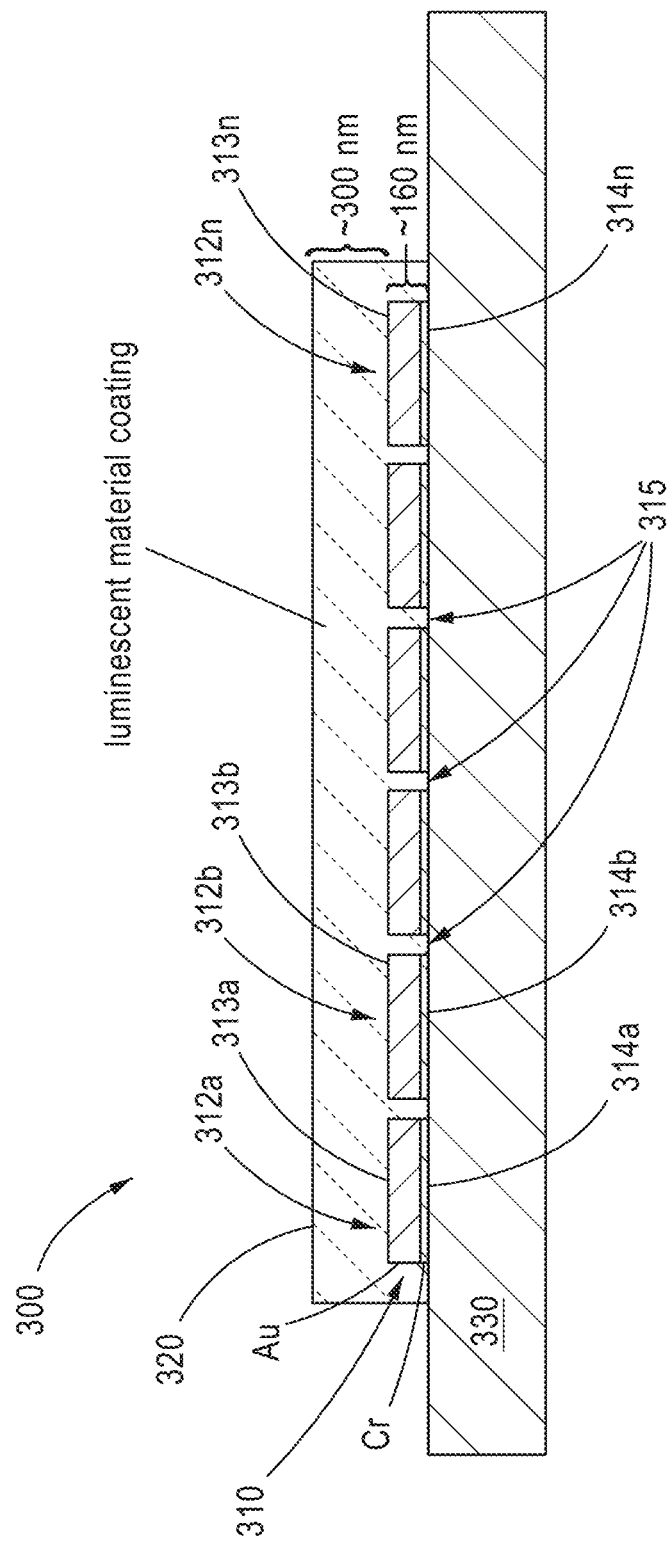

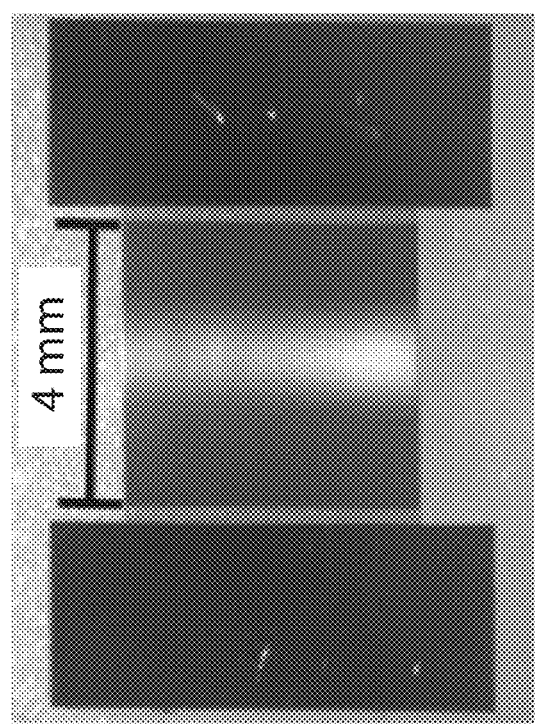
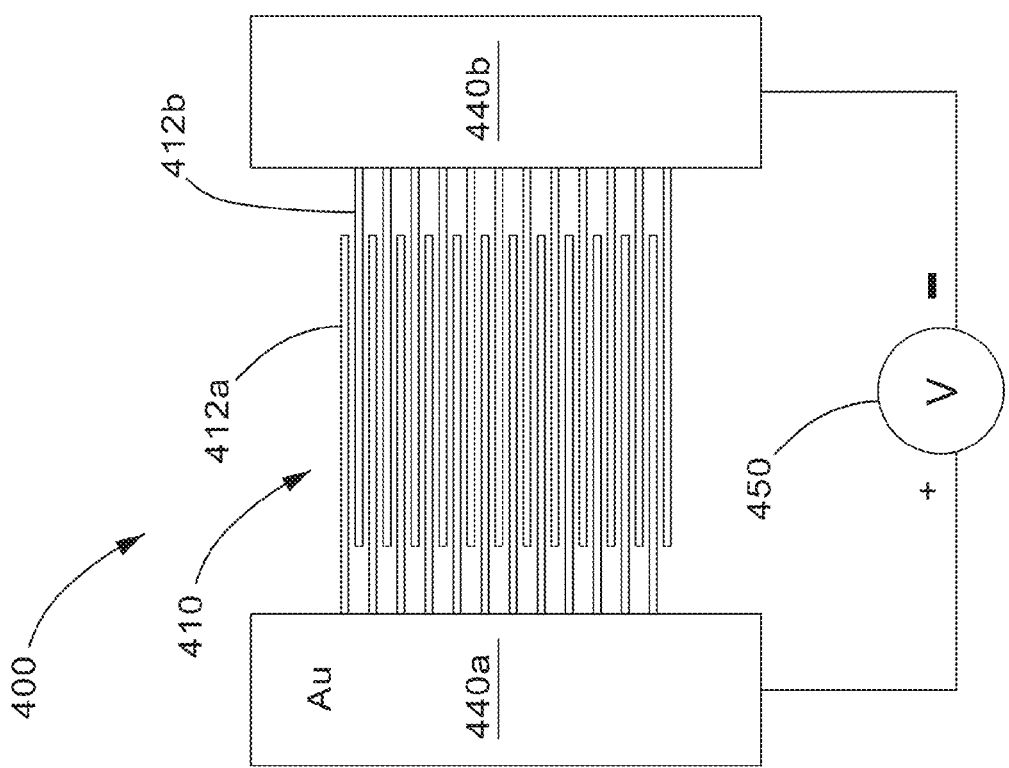
FIG. 4B
FIG. 4A

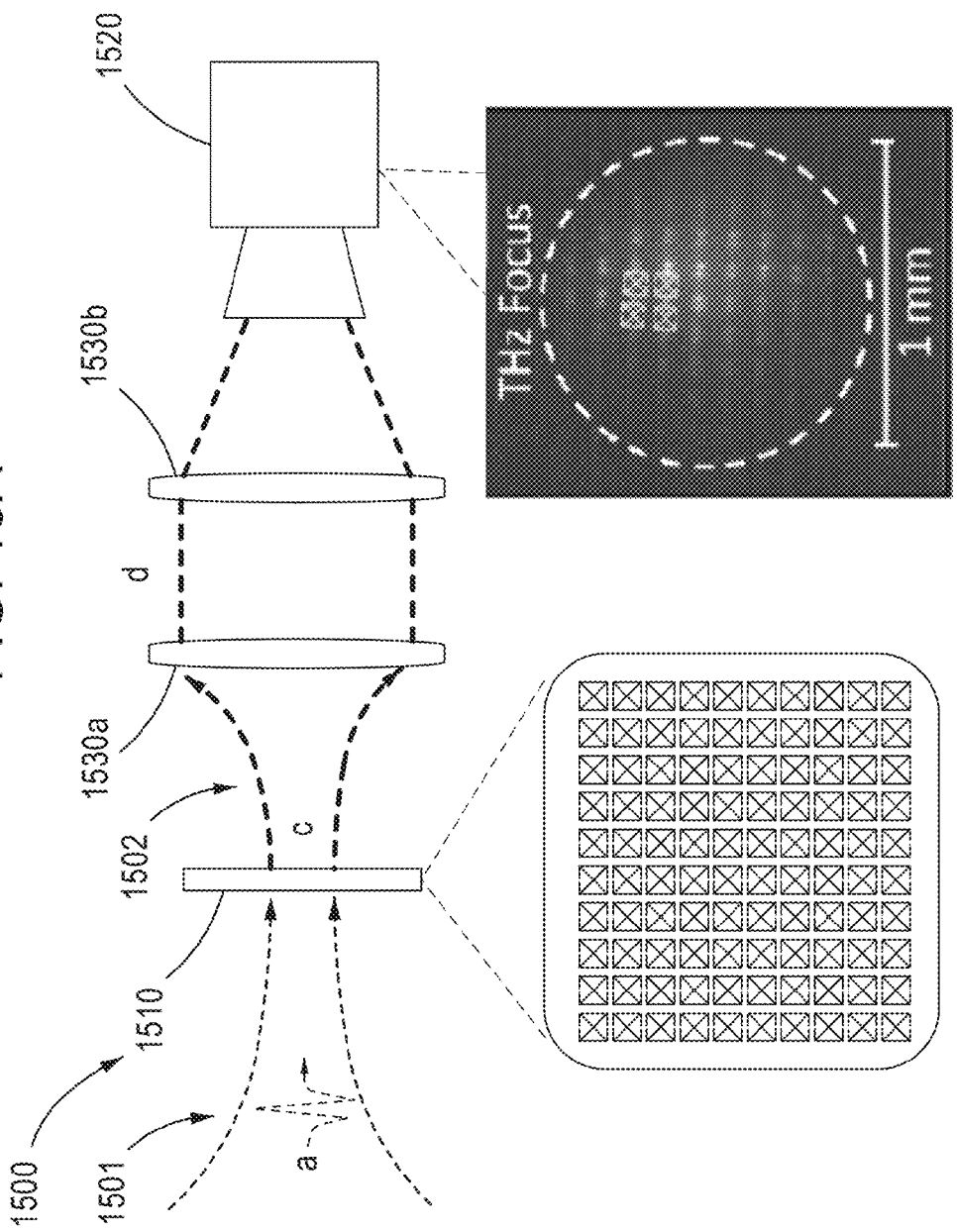

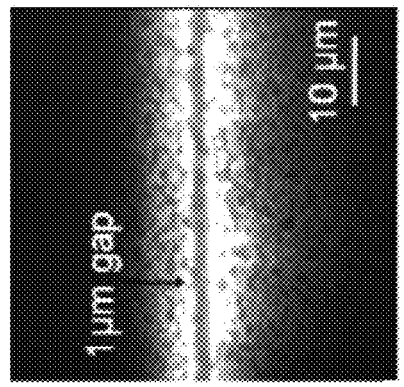
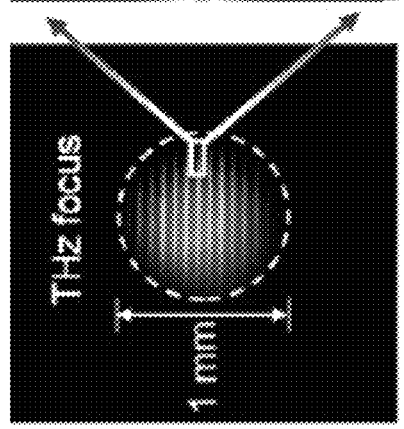
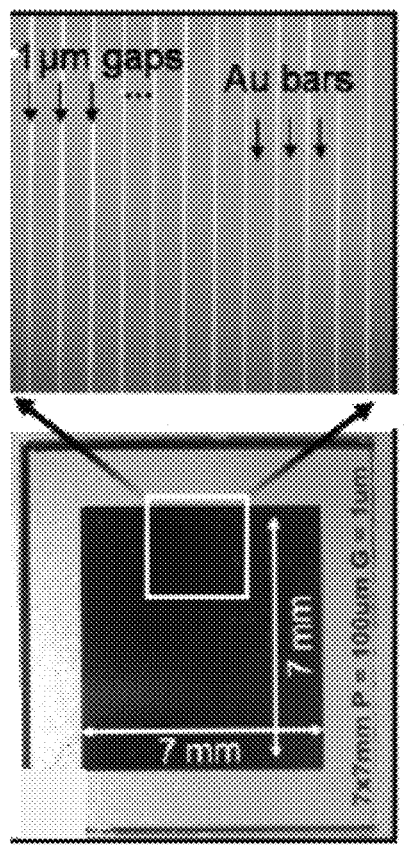
FIG. 18D
FIG. 18C
FIG. 18B
FIG. 18A

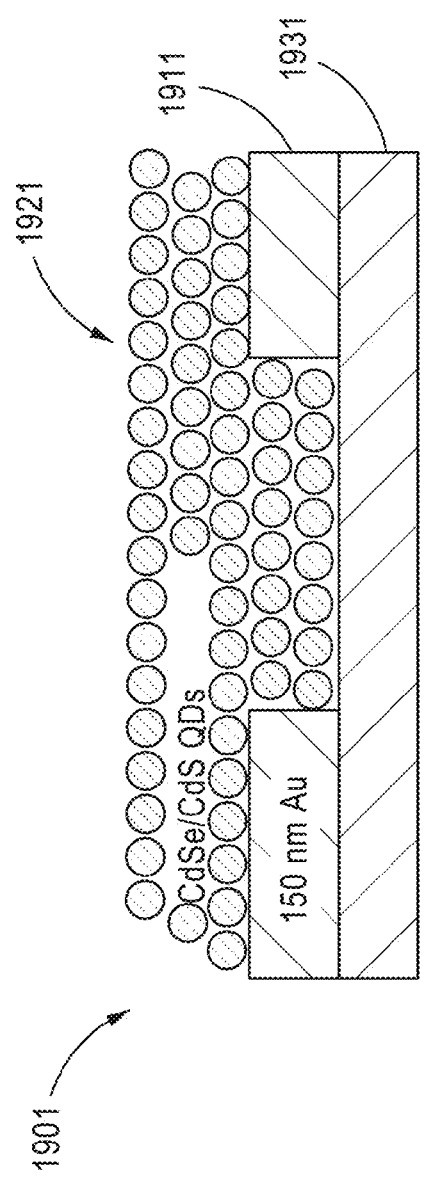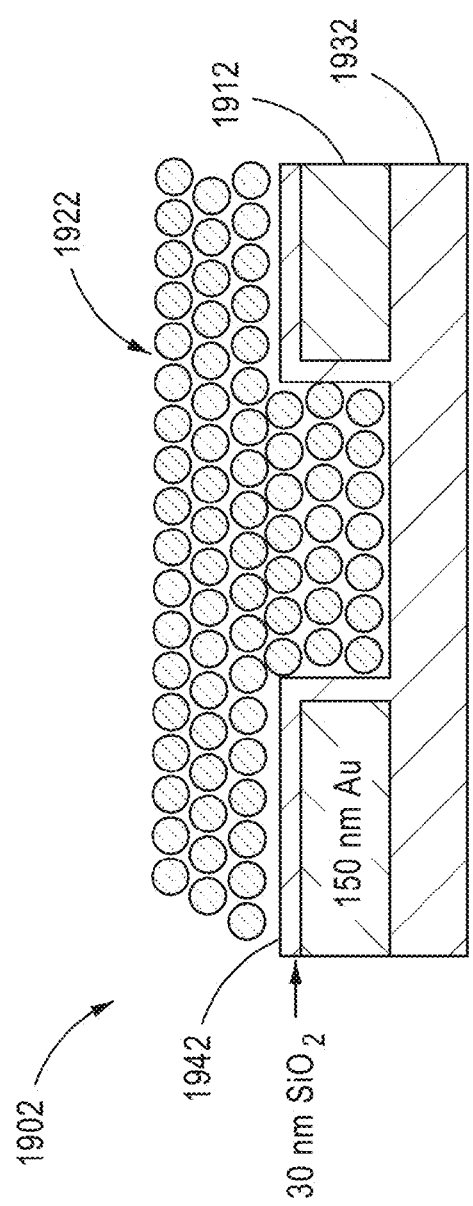
FIG. 19A
FIG. 19B

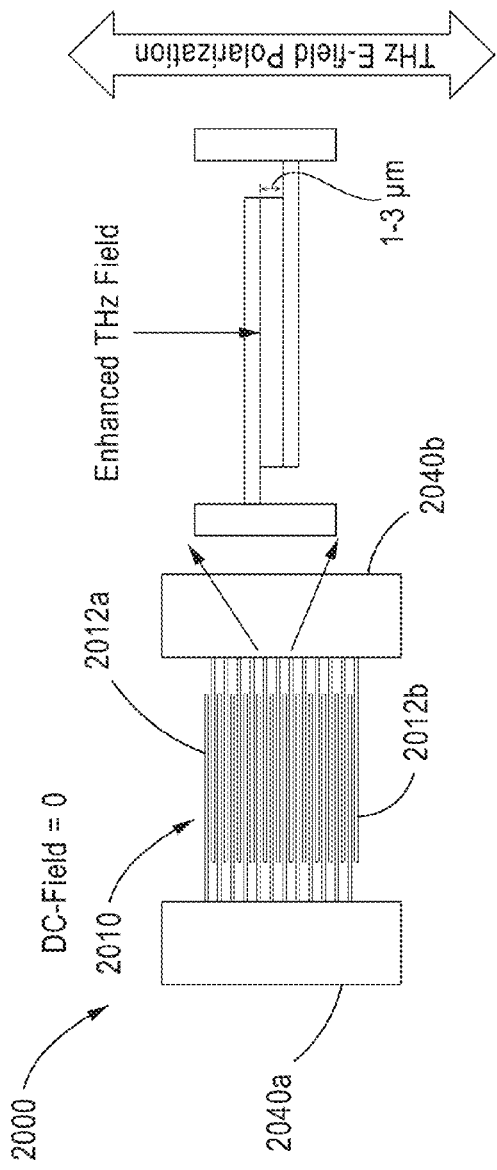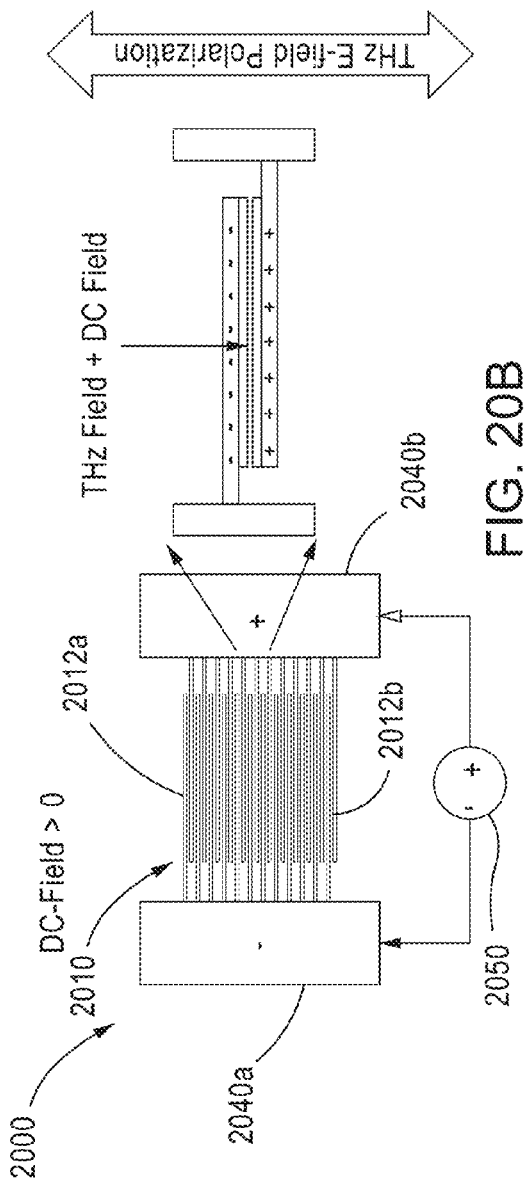
FIG. 20A
FIG. 20B

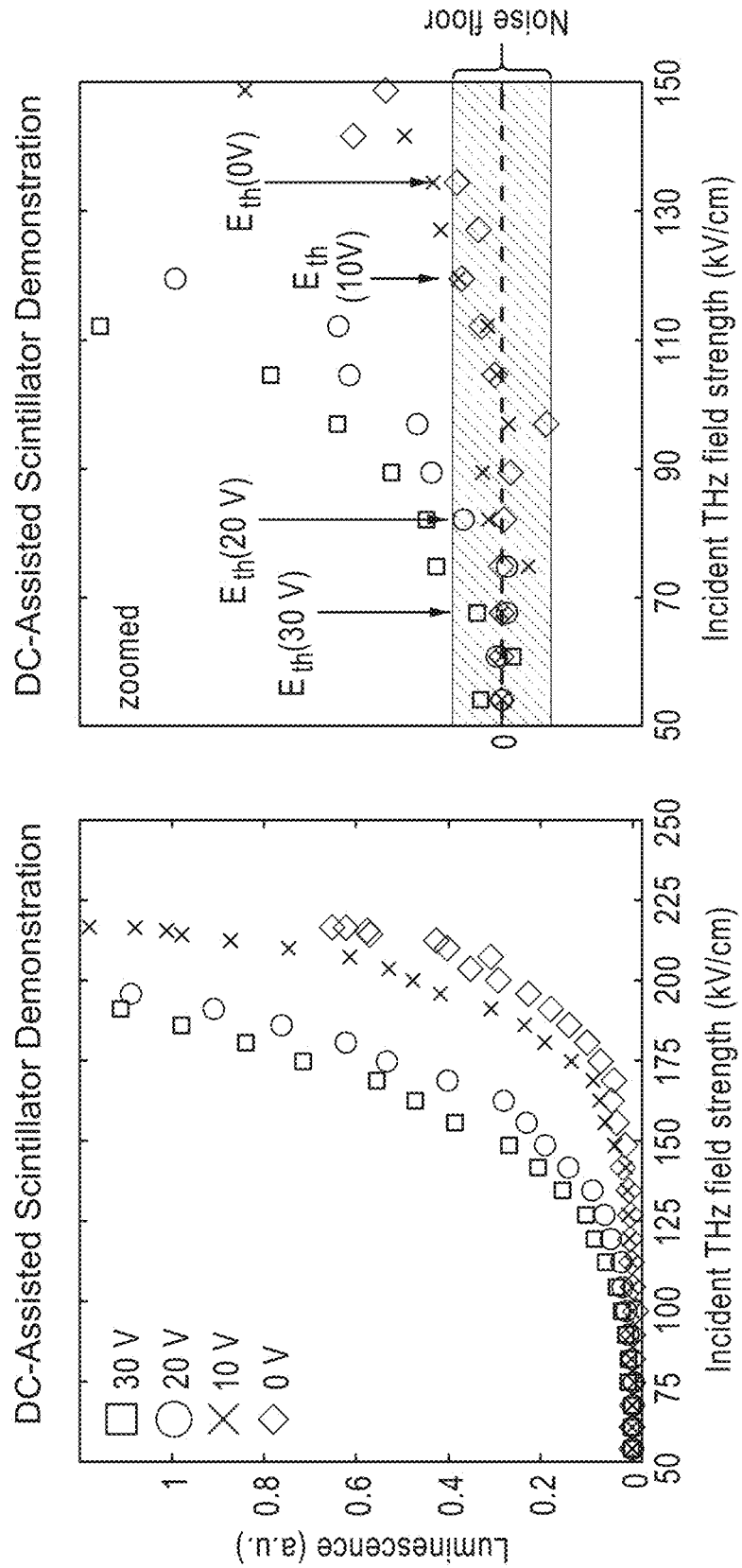

SYSTEMS, METHODS, AND APPARATUS FOR RADIATION DETECTION

CROSS-REFERENCES TO RELATED APPLICATIONS

This application claims priority to U.S. provisional application Ser. No. 62/129,105, filed Mar. 6, 2015, entitled "SCINTILLATOR FOR IMAGING TERAHERTZ LIGHT", U.S. provisional application Ser. No. 62/201,274, filed Aug. 5, 2015, entitled "SCINTILLATOR FOR IMAGING TERAHERTZ LIGHT", and U.S. provisional application Ser. No. 62/216,583, filed Sep. 10, 2015, entitled "SCINTILLATOR FOR IMAGING TERAHERTZ LIGHT" which applications are hereby incorporated herein by reference in their entireties.

GOVERNMENT SUPPORT

This invention was made with Government support under Grant No. N00014-13-1-0509 awarded by the Office of Naval Research. The Government has certain rights in the invention.

BACKGROUND

Electromagnetic radiation at gigahertz and terahertz frequency ranges (e.g., about 100 GHz to about 100 THz) can penetrate many packaging materials from a distance and identify material contained within. For example, terahertz frequencies can facilitate identification of possibly hazardous substances contained within packaging materials. Examples of such packaging materials include shipping containers, storage containers, trucking compartments, etc., that are made of non-conductive materials or sufficiently low conductivity materials.

There are also sizeable economic and social interests in improved security screening methods. Government spending on domestic security alone is estimated at around $75 billion per year. Current screening technologies generally focus on supplying spatial information. For example, the most frequently used security technologies in airports, federal institutions, and other public arenas are x-ray scanners. These technologies can show images of concealed hazards (like knives and guns). However, they provide little to no information about the composition of a potential hazard. Examples of those hazards include explosives, chemical agents, or biological agents. Given that x-rays can be ionizing radiation, there is also the potential for harm to living tissue.

Spectroscopic imaging in the gigahertz and terahertz frequency ranges can be used to identify both the existence of a concealed hazard and its chemical composition. In addition, it is presently believed that electromagnetic radiation in the gigahertz and terahertz frequency ranges does not cause apparent damage to living tissue.

Current terahertz or gigahertz spectroscopic imaging techniques can be time consuming and thus impractical for security screening. Also, there are very few single element or array detectors for these frequency ranges. These include Golay cells, bolometers, and pyroelectric detectors. Each kind of detector has limitations in its ability to be useful both in a wide range of frequencies and as an array. In addition, these kinds of detectors use a thermal response to measure terahertz or gigahertz power. These detectors can be expensive (on the order of $10K to $100K) and slow (response times on the order of millisecond). While photocurrent methods have been employed for detection in the infrared and visible ranges, these photocurrent methods often depend on an above bandgap excitation to create electron-hole pairs which then generate a measureable change in the current or voltage in the device.

SUMMARY

Embodiments of the present invention include apparatus, systems, and methods of detecting electromagnetic radiation. In one example, an apparatus for detecting electromagnetic radiation is disclosed. The electromagnetic radiation has at least one spectral component having a frequency within a range of about 100 GHz to about 100 THz. The apparatus includes at least one conductive structure defining at least one gap to receive the electromagnetic radiation and generate an enhanced electric field in response to the at least one spectral component. The apparatus also includes an electroluminescent (EL) material disposed at least partially within the at least one gap to generate visible light in response to the enhanced electric field.

In another example, a method of detecting electromagnetic radiation is disclosed. The electromagnetic radiation has at least one spectral component having a frequency within a range of about 100 GHz to about 100 THz. The method includes receiving the electromagnetic radiation at afield-enhancing structure (FES) and generating an enhanced electric field at the FES in response to the at least one spectral component. The method also includes emitting visible light from an electroluminescent (EL) material electromagnetically coupled to the FES in response to the enhanced electric field and detecting the visible light emitted by the EL material.

In yet another example, an apparatus for detecting Terahertz radiation includes a substrate and a field-enhancing structure (FES), disposed on the substrate, to receive the Terahertz radiation. The FES includes an array of interdigitated conductive strips defining a plurality of micro-slits to generate an enhanced electric field in response to the Terahertz radiation. The array of interdigitated conductive strips has a pitch of about 10 µm to about 100 µm and each micro-slit in the plurality of micro-slits having a width of about 0.1 µm to about 10 µm. The apparatus also includes a first electrode electrically coupled to a first plurality of metal strips in the plurality of interdigitated metal strips and a second electrode electrically coupled to a second plurality of metal strips in the plurality of interdigitated metal strips to apply a direct current (DC) electric field across the plurality of micro-slits. An electroluminescent (EL) material is disposed at least partially within the plurality of micro-slits to generate light at a wavelength of about 450 nm to about 700 nm in response to the enhanced electric field. A detector is in optical communication with the EL material to detect the visible light.

It should be appreciated that all combinations of the foregoing concepts and additional concepts discussed in greater detail below (provided such concepts are not mutually inconsistent') are contemplated as being part of the inventive subject matter disclosed herein in particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1 shows a schematic of a radiation scintillator including afield-enhancing structure (FES) and an electroluminescent (EL) material.

FIGS. 2A-2B show micro-slits that can be used as the FES in the radiation scintillator shown in FIG. 1.

FIG. 3 shows a cross sectional view of a radiation scintillator including micro-slits defined by gold and chromium strips.

FIG. 4A shows interdigitated micro-slits that can be used in radiation scintillators shown in FIGS. 1-3.

FIG. 4B is a photo of interdigitated micro-slits like those shown in FIG. 4A.

FIG. 15A shows a radiation detection system including a scintillator that uses split ring resonators as an FES and buses to transmit visible light generated by the scintillator to a detector.

FIG. 15B shows a schematic of the FES used in the radiation detection system shown in FIG. 15A.

FIG. 15C is a photo of electroluminescence generated by the scintillator in the radiation detection system shown in FIG. 15A.

FIGS. 18A-18B are microscope images of scintillators made of micro-slits.

FIGS. 18C-18D are microscope images of electroluminescence generated by the scintillators shown in FIGS. 18A-18B in response to THz radiation.

FIGS. 19A-19B show scintillators using quantum dots as the EL material.

FIGS. 20A-20D illustrate radiation detection assisted by Direct Current (DC) fields.

FIGS. 20E-20F show experimental results of radiation detection with and without assistance of DC fields.

DETAILED DESCRIPTION

Overview

Figure 2D:
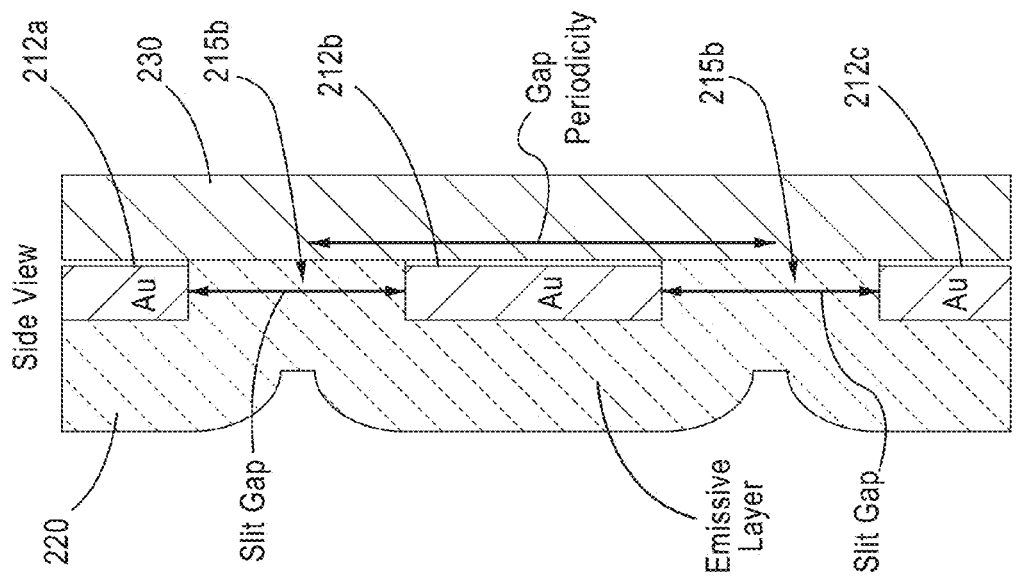
FIGS. 2C and 2D show a perspective view and a cross sectional view of a radiation scintillator including micro-slits.

Light in the terahertz (THz) band has compelling uses for high-resolution imaging, security screening, explosives detection, industrial quality control, biomedical testing, and high-performance wireless communications. All of these applications can benefit from low-cost, high-sensitivity, and high-speed THz detectors, which have remained nontrivial. In addition, current THz detection technologies usually use deep cryogenic cooling, which can be costly and bulky. Portable room temperature detection of THz radiation therefore is highly desirable.

To address, at least partially, the challenges in THz detection, systems, methods, and apparatus described herein employ an approach that includes THz field enhancing structures (FESs) and electroluminescent (EL) materials to form a photonic device, which links the THz band with the visible band via THz-to-visible light up-conversion. This approach utilizes the electric field of incoming THz light, enhanced by the FES, to induce an EL material to luminesce in the visible frequency band. This photonic device can function as a THz-to-visible light scintillator, which can then be coupled to a conventional visible light sensor. Visible light sensing technology is a mature field where single- and multi-element sensors, such as avalanche photodiodes (APDs) and intensified charge-coupled devices (ICCDs), are capable of detecting single photons with nanosecond response times. As a result, this approach can allow cost-effective detection of THz radiation at room temperature, potentially removing one of the major limitations in current THz technologies.

FIG. 1 shows a schematic of an for radiation detection (including THz detection) using field enhancing structures (FESs) and electroluminescent (EL) materials. The apparatus 100 includes a conductive structure 110, also referred to as a field-enhancing structure (FES) which further includes a first portion 110a and a second portion 110b. The two portions 110a and 110b define a gap 115. An electroluminescent (EL) material 120 is disposed in the gap 115. A substrate 130 is used to hold the conductive structure 110 and the EL material 120. Although FIG. 1 shows two disconnected portions 110a and 110b of the conductive structure 110, in practice, the two portions 110a and 110b can be in a single piece. For example, the conductive structure 110 can be a split ring (i.e., a conductive ring with a gap) and the two portions 110a and 110b can be portions of the ring on opposing ends of the gap.

In operation, the conductive structure 110 and the EL material 120 are exposed to the incident radiation 101, which includes spectral components in the frequency range of about 100 GHz to about 100 THz. Upon receiving the incident radiation 101, the conductive structure 110 concentrates the incident radiation 101 within the gap 115, leading to a strong local enhancement of the electric field of the incident radiation 101. The enhanced electric field causes the EL material 120, via the electroluminescence process, to emit visible light 102 (also referred to as visible radiation 102), which can be easily detected by imagers or even human eyes. Since the apparatus 100 can convert the otherwise invisible THz radiation 101 into visible radiation 102, the apparatus 100 is also referred to as a THz scintillator.

The width of the gap 115 (i.e., distance between portions 110a and 110b) is usually comparable to or shorter than the wavelength of the incident radiation 101. For example, the width of the gap 115 can be less than 30 µm (e.g., less than 30 µm, less than 10 µm, less than 5 µm, less than 1 µm, less than 200 nm, less than 100 nm, less than 50 nm, less than 10 nm, etc.). In general, a smaller width of the gap 115 can induce stronger enhancement of the electric field within or near the gap 115 (e.g., close to the edge of the first portion 110a and/or second portion 110b). Therefore, decreasing the gap width can lower the threshold intensity of the incident radiation 101 to initiate the electroluminescence process and accordingly increase the sensitivity of the radiation detection.

On the other hand, it can be helpful to maintain the capacitive nature of the gap 115 without direct current flow (or discharge) between the first portion 110a and the second portion 110b of the conductive structure 110, because potential discharge can dissipate the enhanced electric field. Therefore, the gap 115 can have a finite width to maintain the enhanced electric field without discharge. In practice, the width of the gap 115 can be greater than 1 nm.

The thickness of the gap 115 is defined by the thickness of the conductive structure 10 and can depend on several factors. For example, the thickness of the gap can be greater than 5 nm or so to mitigate nonlocal and quantum effects. On the other hand, it can be helpful for the thickness of the gap 115 to be less than the skin depth (e.g., on the order of 300 nm) of the conductive material constituting the conductive structure 110. Otherwise, the incident radiation 101 may interact only with a surface portion of the conductive structure 110, rendering the rest of the conductive structure 110 unused.

The thickness of the gap 115 also relates to the manufacturing methods used to make the conductive structure 110. The material for the conductive structure 110 can be deposited using thermal evaporation, electron-beam evaporation, physical vapor deposition (PVD), chemical vapor deposition (CVD), plasma-enhanced chemical vapor deposition (PECVD), or laser metal deposition (LMD), among others. The gap 115 can be defined by nanofabrication technologies, such as, optical lithography, electron-beam lithography, and/or focused ion beam milling.

The Conductive Structure

The enhanced electric field, which causes the EL material 120 to emit visible light, is created in the gap 115 via the interaction of the incident radiation 101 with the conductive structure 110. The configuration of the conductive structure 110 (e.g., geographic shape, dimensions, material, etc) can directly affect the field enhancement and therefore the performance of the apparatus 100. Examples of field-enhancing structures that can be used in the apparatus 100 are described below with reference to FIGS. 2A-9.

Field-Enhancing Structures Using Micro-Slits

Figure 2C:
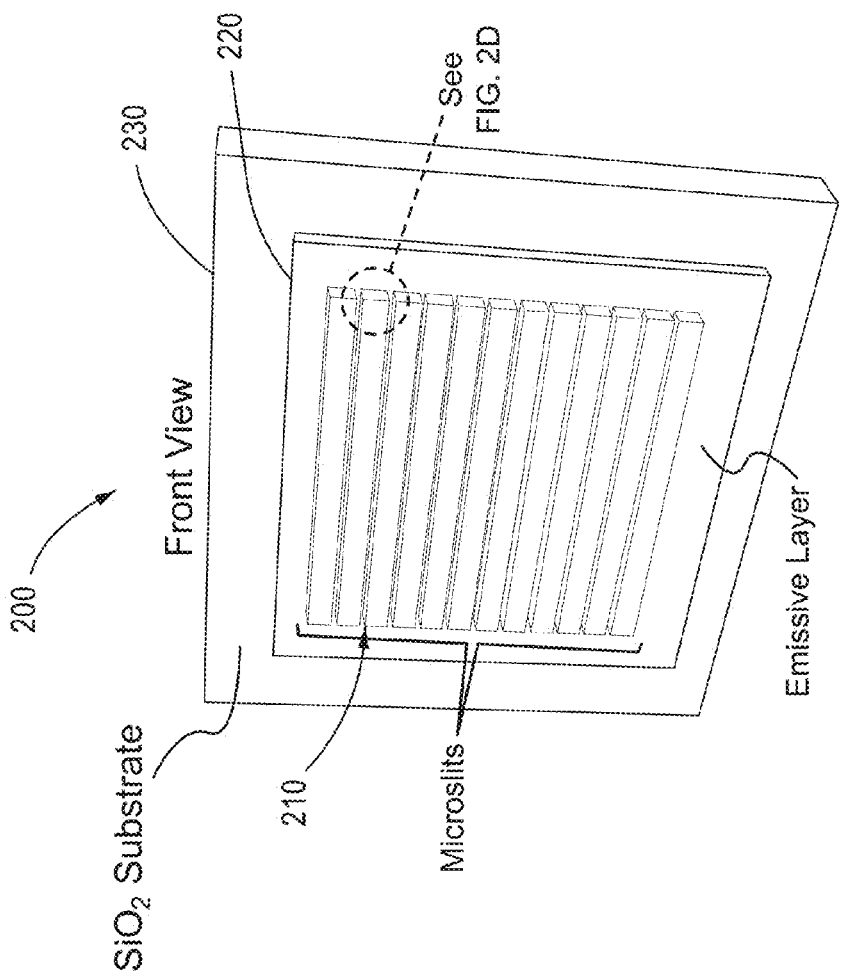

FIGS. 2A-2B show a top view of a micro-slit array that can be used as the field-enhancing structure for THz scintillation. FIGS. 2C-2D show a perspective view and cross sectional view of a THz scintillator using the micro-slit array shown in FIGS. 2A-2B.

The micro-slit array 210 includes a plurality of conductive strips 212a, 212b, . . . , 212(n−1), and 212n, collectively referred to as conductive strips 212. Each pair of adjacent conductive strips 212 defines a slit 215a, 215b, . . . , 215(n−1), collectively referred to slits 215. When incident radiation interacts with the conductive strips 212, part of the electric field of the incident radiation can be trapped within the slits 215 and enhanced therein. As shown in FIG. 2B, the enhanced electric field is usually stronger close to the edge of the conductive strips 212 that define the slit 215. The enhancement of THz field in the slits 215 is non-resonant. Therefore, the micro-slit array 210 can be responsive to abroad range of frequencies (e.g., for radiation having wavelengths greater than the slit width) and accordingly can be used for broadband THz detection.

The conductive strips 212 can be made of various conductive materials. Generally, it can be helpful to use high-conductivity materials to mitigate potential losses of the incident radiation when interacting with the micro-slit array 210. In one example, the conductive strips 212 can include metal materials, such as gold, platinum copper, tantalum, tin, tungsten, titanium, tungsten, cobalt, chromium, silver, nickel or aluminum, or a binary or ternary system of any of these conductive materials. In another example, the conductive strips 212 can include a conductive metal oxide, such as TiN, $TiB_2$, $MoSi_2$, n-$BaTiO_3$, $(Fe, Ti)_2O_3$, $ReO_3$, $RuO_2$, and $IrO_2$, among others. In yet another example, the conductive strips 212 may use carbon-based conductive materials, such as graphene.

The width of the slits 215 can range from several nanometers (usually referred to as nano-slits) to tens of microns (usually referred to as micro-slits), depending, for example, on the target frequency to be detected. For example, for certain gap sizes ranging down to nanometers, the response can be tuned from the THz band into the far and mid infrared (IR), thereby allowing detection of these wavelengths or very broadband operation of the resulting detector. The length of the conductive strip 212 can range from a millimeter to centimeters (e.g., 1-2 cm) depending on, for example, feasibility of fabrication and form factors of the resulting device.

FIG. 2A shows multiple slits 215 and accordingly multiple conductive strips 212 for illustrating purposes only. In practice, the micro-slit array 210 can include only one slit 215 defined by two conductive strips 212a and 212b (e.g., shown in FIG. 2B). Since the conductive strips 212 and slit 215 can be made using advanced nano-fabrication techniques, the size of a single slit scintillator can be on nanometer scale, even less than pixel sizes in existing imagers. Therefore, a high-resolution THz detector can be constructed by an array (one dimensional or two dimensional) of single slit scintillators.

Alternatively, the micro-slit array 210 can include multiple slits 215 and accordingly multiple conductive strips 212. In one example, the multiple slits 215 can be arranged periodically having a pitch of about 10 μm to about 100 μm. In general, given the same slit width, increasing the pitch (i.e. increasing the width of the conductive strips 212) can increase the enhancement of the electric field within the slit 215. In another example, the multiple slits 215 can be arrayed in an aperiodic manner to have, for example, different sensitivities at different areas of the resulting scintillator.

In one example, all the slits 215 in the micro-slit array 210 have the same width to form a grating-like structure and can create frequency-independent enhancement of electric field. In another example, different slits 215 can have different widths such that some slits are more sensitive to one wavelength while other slits are more sensitive to another wavelength. As a result, the micro-slit array 215 can facilitate spectroscopic detection.

FIGS. 2A-2B also show that the polarization direction of the incident radiation is perpendicular to the longitudinal direction of the slits 215. In one example, as shown in FIGS. 2A-2B, all the slits 215 are along the same direction and are tuned to detect incident radiation of a specific polarization. In another example, the micro-slit array 210 can include slits 215 along different directions. For example, the micro-slit array 210 can have a first layer of slits 215 along the x direction stacked on a second layer of slits 215 along the y direction (perpendicular to the x direction). Additionally or alternatively, the two layers of slits 215 can be juxtaposed (e.g., neighboring each other in the same plane). In this case, the micro-slit array 210 can detect incident radiation of arbitrary polarization.

FIGS. 2C-2D illustrate a scintillator 200 that uses a micro-slit array 210 as the field-enhancing structure for radiation detection. The micro-slit array 210 is disposed on a substrate 230. The micro-slit array 210 includes a plurality of conductive strips 212a, 212b, and 212c defining slits 215a and 215b. An emissive layer 220 comprising electroluminescent materials is deposited on the substrate 230 and fills the slits 215. In FIGS. 2C-2D, gold is used to make the conductive strips 212 and silicon oxide is used to make the substrate 230.

FIG. 3 shows a cross sectional view of a scintillator 300 using a micro-slit array 310 that use composite metal strips. The micro-slit array 310 is disposed on a substrate 330. The micro-slit array 310 includes a plurality of metal strips 312a, 312b, . . . , 312n (collectively referred to as metal strips 312) defining a plurality of slits 315 in between. Each metal strip 312a, 312b, . . . , 312n includes a gold layer 313a, 313b, . . . , 313n disposed on a chromium layer 314a, 314b, . . . 314n. The chromium layers 314a to 314n are in contact with the substrate 330 and can function as an adhesion layer to help the gold layer 313a to 313n to stay in position. A luminescent coating 320 comprising electroluminescent materials is disposed on the substrate 330 to fill the slits defined by the metal strips 312a to 312n. In this example, the metal strips 312 have a thickness of about 160 nm and the luminescent coating 320 has a total thickness of about 480 nm, with 320 nm above the metal strips 312.

FIG. 4A shows a schematic of a micro-slit array 400 including interdigitated metal strips 410. A first half 412a of the metal strips in the plurality of interdigitated metal strips 410 is connected to a positive electrode 440a. A second half 412b of the metal strips in the plurality of interdigitated metal strips 410 is connected to a negative electrode 440b. The positive electrode 440a and the negative electrode 440b are connected to a power source 450. Neighboring metal strips are usually connected to opposite electrodes to create a direct current (DC) field across the slits defined by the metal strips 410. Without a DC bias, the electric field in the slits is supplied by the enhanced THz field alone, as described above. When a DC bias is applied, however, an additional DC component to the in-gap field is introduced, which can increase the luminescence output of the scintillator or reduce the threshold intensity to generate electroluminescence. In addition, the electrodes 440 can also be employed to apply an alternating current (AC) field to mitigate degradation of the field-enhancing structure. FIG. 4B is a photo of an example micro-slit array including interdigitated metal strips (using gold as the strip material). Metal strips in the example micro-slit array have a length of about 4 mm.

Field-Enhancing Structures Using Split Ring Resonators

Figures 5A, 5B:
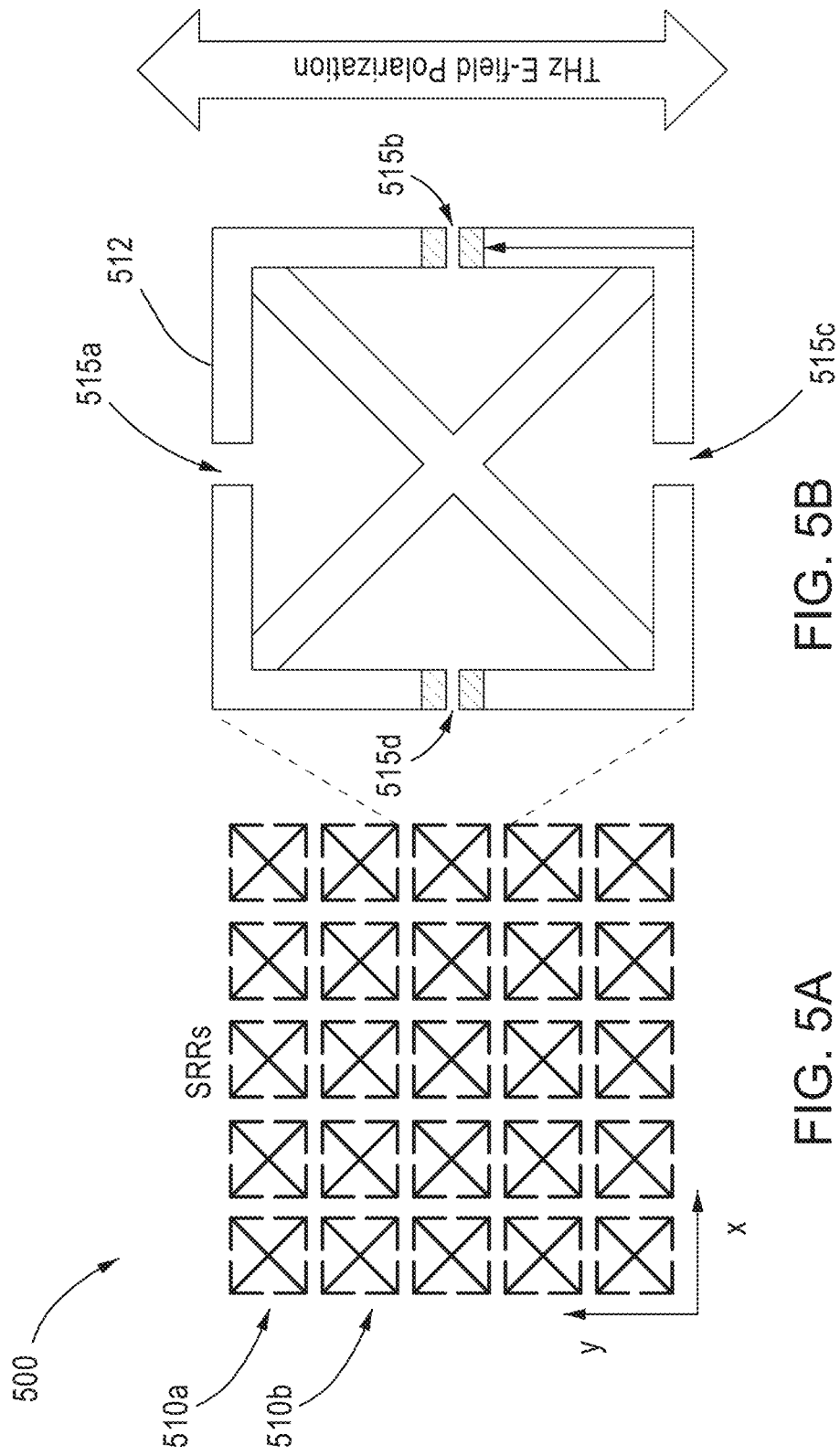
FIGS. 5A-5B show split ring resonators (SRRs) that can be used as the FES shown in FIG. 1.

FIGS. 5A-5B show schematics of a field-enhancing structure (FES) 500 including split ring resonators (SRRs). More specifically, the FES 500 includes an array of split ring resonators 510a and 510b (two are labeled; collectively referred to as split ring resonators 510). Each split ring resonator 510 includes a metal structure 512 defining four gaps 515a, 515b, 515c, and 515d. When the incident radiation has a polarization along the vertical direction (y direction in FIG. 5A), the two gaps 515b and 515d can trap and enhance the electric field of the incident radiation, as shown in FIG. 5B. In contrast, when the incident radiation has a polarization along the horizontal direction (x direction in FIG. 5A), the two gaps 515a and 515c can trap and enhance the electric field of the incident radiation. Diagonally or elliptically polarized radiation produces enhanced fields in all four gaps 515. Therefore, one split ring resonator 510 can detect incident radiation of arbitrary polarization.

In the example shown in FIGS. 5A-5B, each split ring resonator 510 has four gaps. In another example, the split ring resonator 510 can have less than four gaps. For example, the split ring resonator 510 can include a simple conductive ring having one gap. Alternatively, the split ring resonator 510 can be substantially similar to the one shown in FIG. 5B but has only two or three of the four gaps. In yet another example, the split ring resonator 510 can have more than four gaps.

The split ring resonator 510 typically enhances the electric field of the incident radiation via resonance. In other words, the split ring resonator 510 is tunable to respond to and enhance electric fields oscillating at a specified THz frequency. As a result, the field-enhancing structure 500 can include split ring resonators 510 having different resonant frequencies so as to perform frequency-resolved imaging and sensing. For example, a THz-frequency Bayer filter array for a camera sensor can be constructed with split ring resonators 510 resonant at specified THz frequencies (e.g., see FIG. 12). In addition, each split ring resonator 510 may resonate at multiple frequencies by, for example, having different width for different gaps in the split ring resonator 510.

The resonant frequency of the split ring resonator 510 can also be dynamically tuned during operation of the scintillator, therefore allowing flexible adjustment of the scintillator in response to changing target frequencies.

Figure 5C:
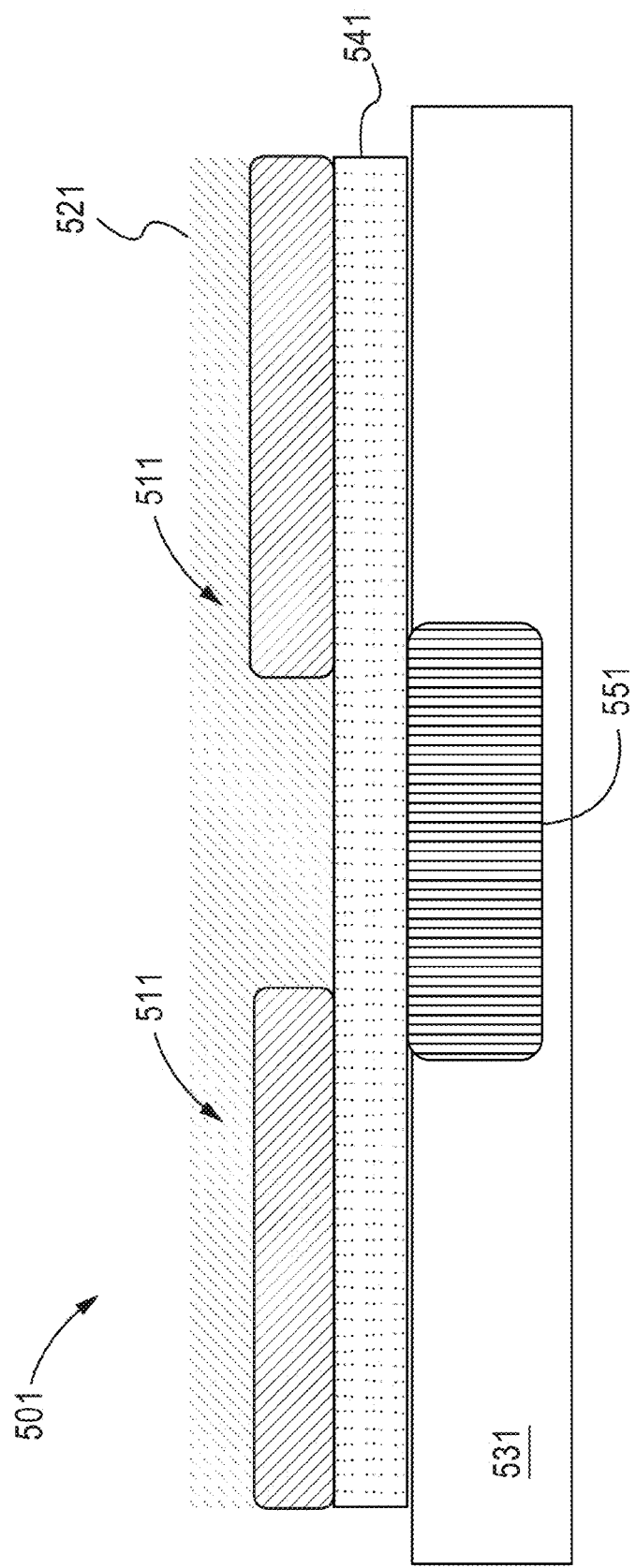
FIG. 5C shows a cross sectional view of a scintillator including a splint ring resonator disposed on a phase change material for resonant frequency tuning.

FIG. 5C shows a scintillator 501 including a split ring resonator 511 disposed on a phase change layer 541 supported by a substrate 531. An emissive layer 521 covers the split ring resonator 511. The scintillator 501 also includes an actuator 551 disposed underneath the phase change layer 541 to cause phase transition of the phase change layer 541. The phase change layer 541 comprises a phase change material, which can undergo significant change of conductivity (e.g., four orders of magnitudes) when changing from one phase to another. The thickness of the split ring resonator 511 and the underlying phase change layer 541 can be smaller than the pitch of the array of split ring resonators in the scintillator 501, such that they form an effective metamaterial layer. In this manner, the underlying phase change layer 541, as part of the metamaterial, can affect the overall response of the field-enhancing structure (i.e. split ring resonator 511). Therefore, by changing the phase change layer 541 from one phase to another using the actuator 551, the resonant frequency of the split ring resonator 511 can change accordingly.

Various phase change materials can be deposited under the split ring resonator 511 to change the resonant frequency. In one example, the phase change material includes germanium-antimony-tellurium (GeSbTe, also referred to as GST), which can have good phase-change repeatability and large optical differences between the amorphous phase and crystalline phase. In another example, the phase change material includes a Mott insulator (e.g., $VO_2$) that can be switched between a metal phase and an insulator phase. In yet another example, the phase change material includes one or more of AgInSbTe, InSe, SbSe, AsSe, GeSbSe, InSbTe, AgInSbSeTe, and GeSbTeSe.

The phase transition of the phase change material can be induced via temperature change. In one example, a microscale hot plate can be disposed nearby the phase change material as the actuator 551 to adjust the temperature. In another example, the phase transition can be obtained by direct current injection through the phase change material. In yet another example, a phase transition in the phase change materials can be triggered via mechanical actuation, optical actuation (e.g., plasmonic absorption using meta-material or photonic crystal), electric field driven (non-heating) transformation, resistive heating, laser annealing/heating, or magnetic actuation. More details of frequency tuning in split ring resonators can be found in U.S. Pat. No. 8,836,439, which is incorporated herein in its entirety.

Conductive materials (e.g., metal, conductive metal oxide, graphene, etc.) are used to make the field-enhancing structures described above. In practice, semiconductors can also be used to make the field-enhance structures to detect strong THz radiations, which can metallize the semiconductor materials. This semiconductor field-enhancing structure can be useful for higher field strength THz detection where a normal metal may produce too strong a field and damage the emissive material (EL material).

Micro-slit arrays and split ring resonators are described herein as illustrating and non-limiting examples of field-enhancing structures that can be used in THz scintillators. More examples of field-enhancing structures can be found in U.S. Pat. No. 9,000,376, which is incorporated herein in its entirety.

The EL Materials

The EL material 120 shown in FIG. 1 (or the emissive layer 220 shown in FIG. 2C, or the luminescent coating 320 shown in FIG. 3) can be formed of many suitable materials. Organic or quantum dot (also simply referred to as QD) light emitting diodes (OLEDs or QDLEDs, respectively) can be employed to construct an emissive layer sandwiched between two electrodes. Such a device can function through radiative recombination of electrons and holes injected from the biased electrodes. By placing an EL material into the field-enhancing gaps of split ring resonators or micro-slits, a THz-driven light emitting device can be formed, in which the incident THz electric field transiently biases the FES gaps, injecting into the emissive layer electrons and holes that radiatively recombine.

In one example, the EL material can include Tris(8-hydroxyquinolinato)aluminum (formula $Al(C_9H_6NO)$, widely abbreviated as $Alq_3$), which is usually used as organic light emitting materials. In another example, the EL material can include $Alq_3$ doped with 4-(dicyanomethylene)-2-methyl-6-(p-dimethylaminostyryl)-4H-pyran (DCM), also referred to as $Alq_3$:DCM.

In yet another example, the EL material includes quantum dots. QDs are nanometer-scale semiconductor crystals and are defined as particles with physical dimensions smaller than the exciton Bohr radius. Quantum dots usually include a core surrounded by a shell. The QD core can include elements from the II-VI group (e.g. CdSe, CdTe, CdS, ZnSe), III-V group (e.g. InP, InAs), or IV-VI group (e.g., PbSe). The shell can include CdS, CdTe, or ZnS, among others.

Quantum dots can be tuned to luminesce from the near UV down to the infrared (IR) and near IR. Infrared emission of quantum dots can be useful because IR cameras can be used to collect the emitted light. IR quantum dots usually have a smaller band gap, and devices with these IR quantum dots can have much higher sensitivity.

The dimensions of the quantum dot(s) can vary from single nanometers to tens of nanometers. Quantum dots of different sizes can generate emissions at different wavelengths. The dimensions of quantum dots can also affect the efficiencies to luminesce. Without being bound by any particular theory or mode of operation, confinements affect the energy levels of particles. In this case, quantum dots confine electrons. Therefore, changing the size of quantum dots can change the confinement and accordingly change the energy levels of the electrons. This in turn can change the band gap energy, thereby making a new emission wavelength. Quantum dots can emit throughout the visible spectrum and into the by tuning the sizes.

Efficiency of quantum dots is usually determined by nonradiative pathways that an excited electron can relax, such as auger recombination. The dimensions such as the core and shell thickness can affect auger recombination and thereby affect the emission efficiency.

In one example, the quantum dots can be directly applied over the field-enhancing structure. In another example, the quantum dots can be encapsulated in a polymer layer to mitigate or prevent outside damage.

In one example, the EL material 120 can include a single species of quantum dots to emit a single wavelength. In another example, different quantum dots can be used to emit different wavelengths. For example, a THz scintillator can use split ring resonators as the fi enhancing structure. One species of quantum dots can be applied over split ring resonators having one resonant frequency can and another species of quantum dots can be applied over split ring resonators having another resonant frequency. In this case, the wavelength of the incident THz radiation can be determined by the color or wavelength of the emitted light.

Figure 6A:
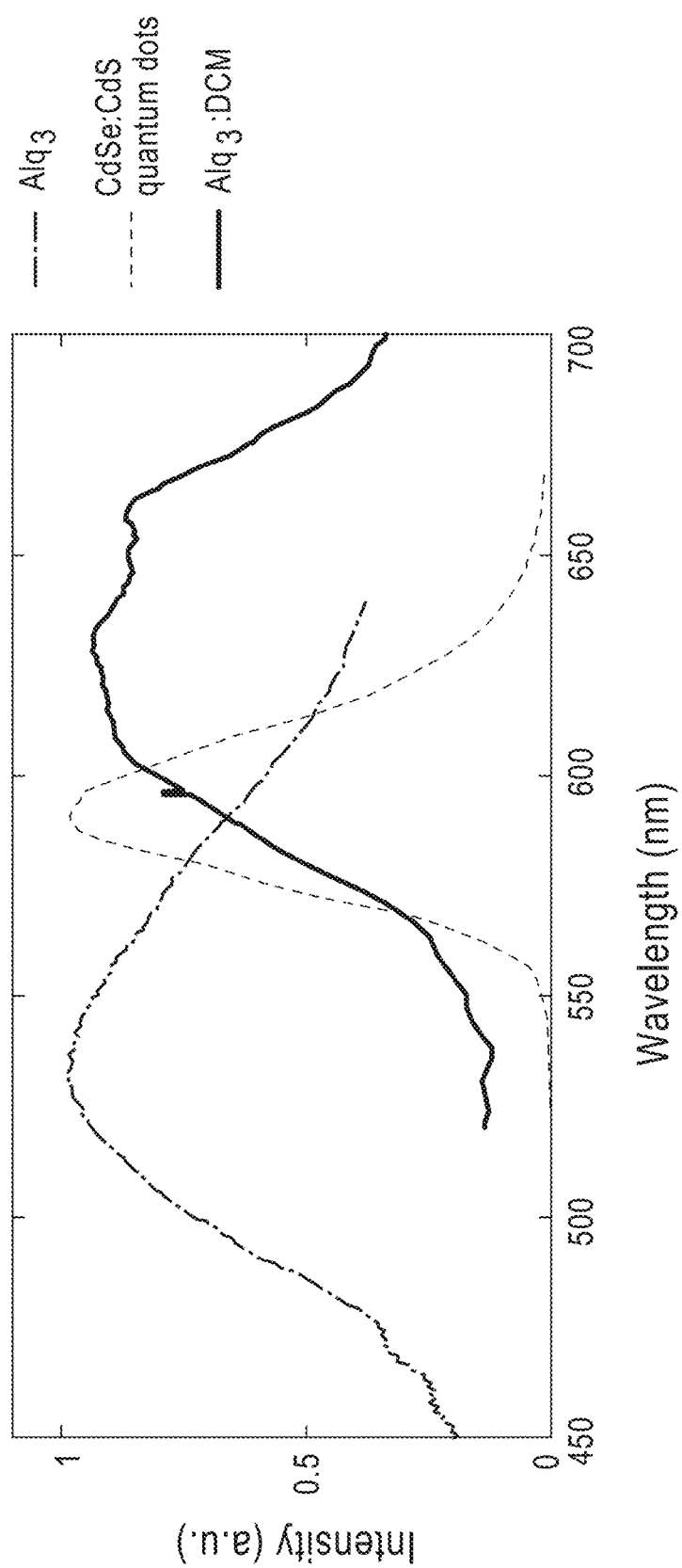
FIG. 6A shows emission spectra of three EL materials including $Alq_3$, $Alq_3$ doped with DCM, and CdSe:CdS quantum dots.
Figure 6B:
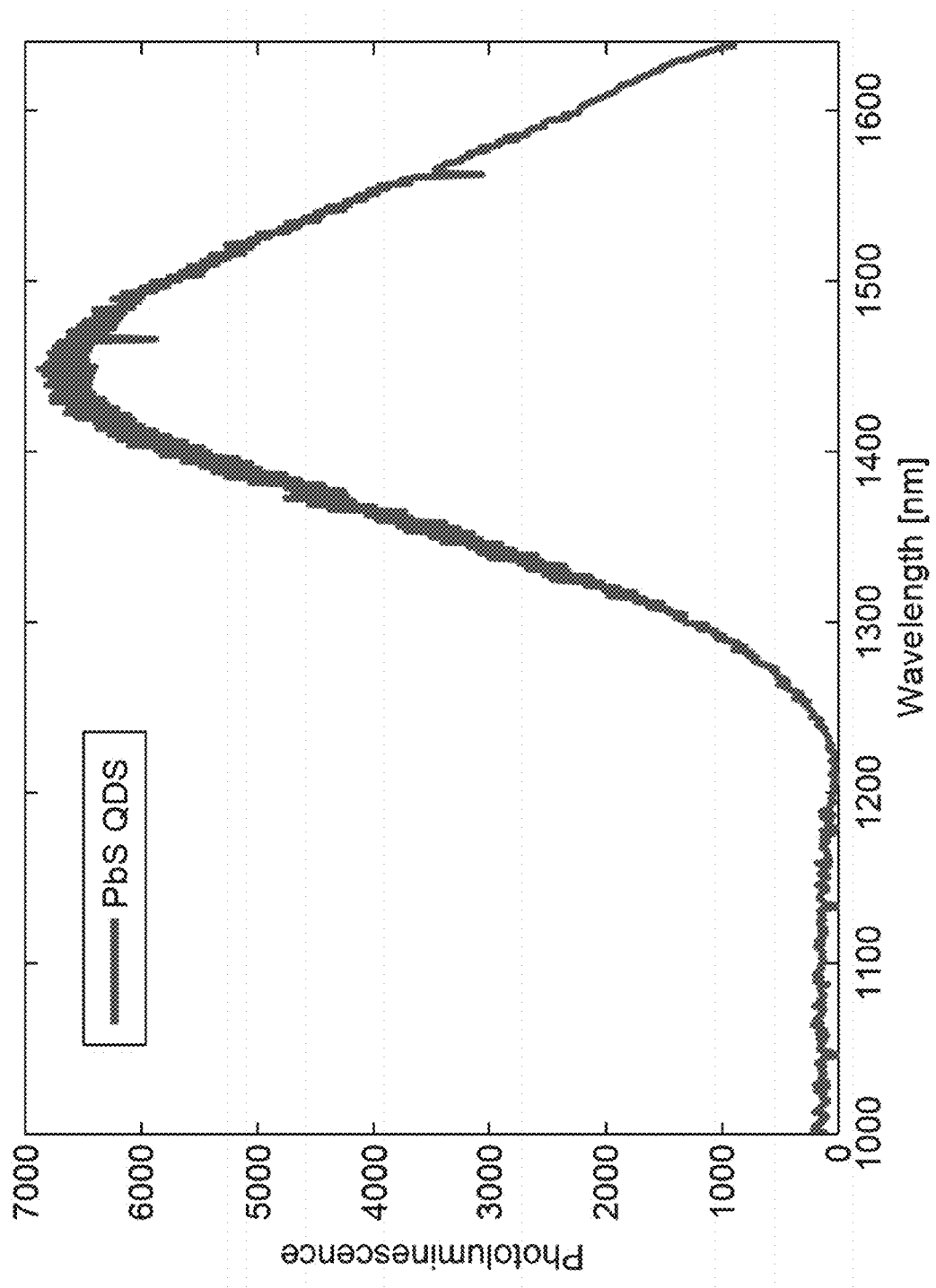
FIG. 6B shows emission spectra of PdS quantum dots.

FIG. 6A shows electroluminescence spectra originating from micro-slits coated with $Alq_3$, $Alq_3$:DCM, and CdSe/CdS core/shell QDs. As shown by FIG. 6A, $Alq_3$ can emit visible light spanning from about 450 nm to about 650 nm. Doping $Alq_3$ with DCM can shift the emission spectra to the range between about 550 nm and about 700 nm. In contrast, quantum dots typically emit light at wavelengths centered about 590 nm, with a bandwidth of about 50 nm to about 60 nm. These three spectra, taken together, span nearly the entire visible region, thereby allowing flexible operations of THz scintillators at different output wavelengths. The emission spectra of the EL material can also be extended to near IR and IR region by, for example using different materials for the quantum dots or adjusting the size of the quantum dots. FIG. 6B shows the emission spectrum of PbS (Lead sulfide) quantum dots. The spectrum has a center wavelength at about 1430 nm, which is in the near IR and IR region.

Increase Sensitivity of THz Scintillators

As described above, reducing the gap size in the field-enhancing structure can increase the enhancement of electric field within the gap and therefore increase the sensitivity of the scintillators. In addition, applying a DC electric field across the gap can also help increase the output luminescence and accordingly the sensitivity of the scintillator (see, e.g., FIGS. 4A-4B and the associated descriptions). Other than these two approaches, there are at least two other approaches that can be used to improve sensitivity of THz scintillators based on field-enhancing structures. These two approaches are described below with reference to FIGS. 7-10.

Figure 7:
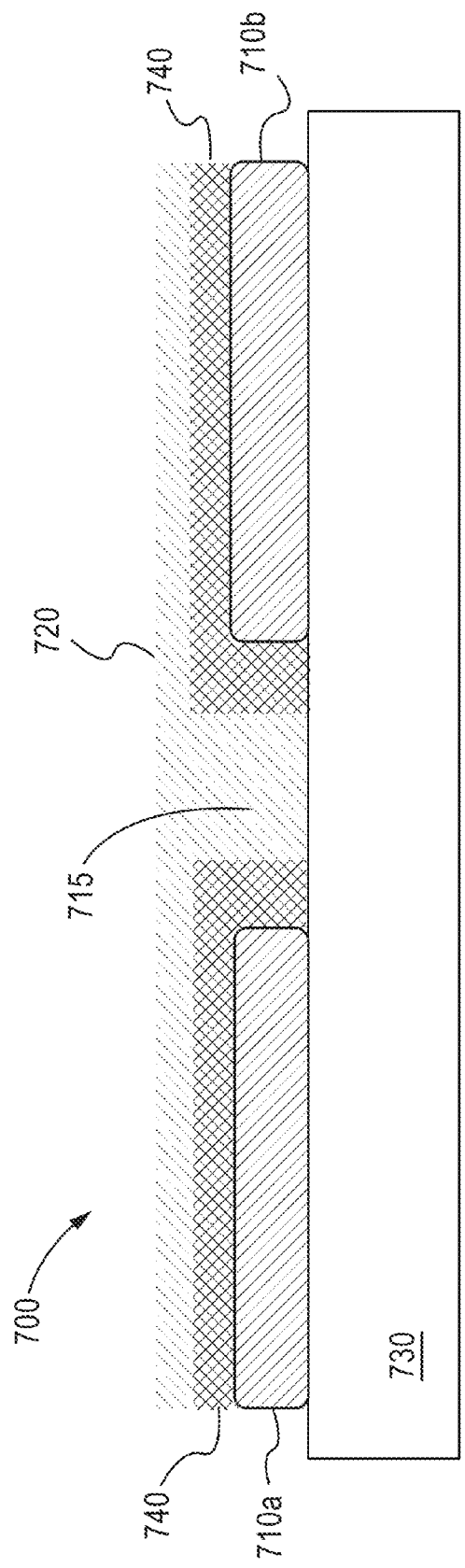
FIG. 7 shows a cross sectional view of a radiation scintillator including a dielectric layer disposed between a FES and an EL material.

FIG. 7 shows a scintillator 700 with a dielectric layer 740 to separate the field-enhancing structure and the EL material. The scintillator 700 includes conductive structures 710a and 710b (can be a single conductive piece as described above with reference to FIG. 1) disposed on a substrate 730 to define a gap 715. A dielectric layer 740 is conformally disposed on the conductive structure 710a and 710b, covering both the top surfaces and the side surfaces of the conductive structures 710a and 710b. An emissive layer 720 comprising EL material covers the dielectric layer 740 and fill the gap 715. The dielectric layer 740 can electrically insulate the conductive structures 710a and 710b from the emissive layer 720. When quantum dots are used as the EL material for the emissive layer 720, the luminescence yield can be greater when the dielectric layer 740 is used.

In one example, the dielectric layer 740 can include silicon oxide (e.g., $SiO_2$). In another example, the dielectric layer 740 can include other materials that can be conformally deposited, such as $Al_2O_3$, $ZrO_2$, $HfO_2$, among others known in the art.

Figure 8:
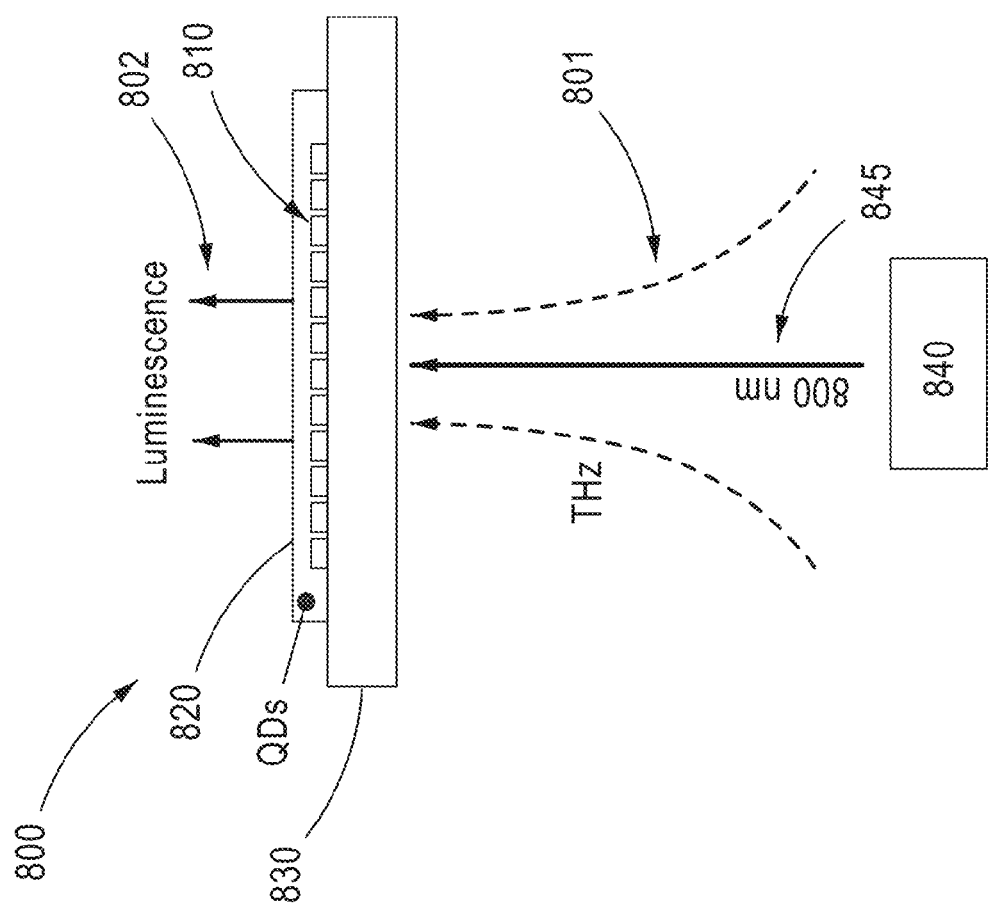
FIG. 8 shows a radiation scintillator including a light beam to enhance the sensitivity.

FIG. 8 shows a schematic of a scintillator 800 that uses a visible or near infrared beam 845 to improve the sensitivity. The scintillator 800 includes a field-enhancing structure 810 disposed on a substrate 830. An emissive layer 820 comprising EL materials is disposed on the field enhancing structure 810. A light source 840 is employed to provide an optical beam 845 to illuminate the emissive layer 820.

The scintillator 800 can operate in at least two different modes. In the first mode, the optical beam 845 is not used. The scintillator 800 operates by creating visible light 802 through electroluminescence of the emissive layer 820 in response to the enhancement of electric field in the field-enhancing structure 810. In other words, the incident THz radiation 801 normally provides all the electric field that drives the electroluminescence.

In the second mode, when the optical beam 845 is applied, the incident THz radiation 801 does not directly cause the emission of the emissive layer 820. Instead, the enhanced electric field of the THz radiation 810 distorts the energy bands of the emissive layer 820 such that visible light 802 is generated by the optical beam 845 via photoluminescence in the emissive layer 820. This electric field to induce the energy based distortion in the second mode is typically lower than the electric field to induce electroluminescence in the first mode. Therefore, in the second mode the scintillator 800 can detect THz radiation with lower intensities. In other words, the sensitivity of the scintillator 800 in the second mode is higher.

Figure 9B:
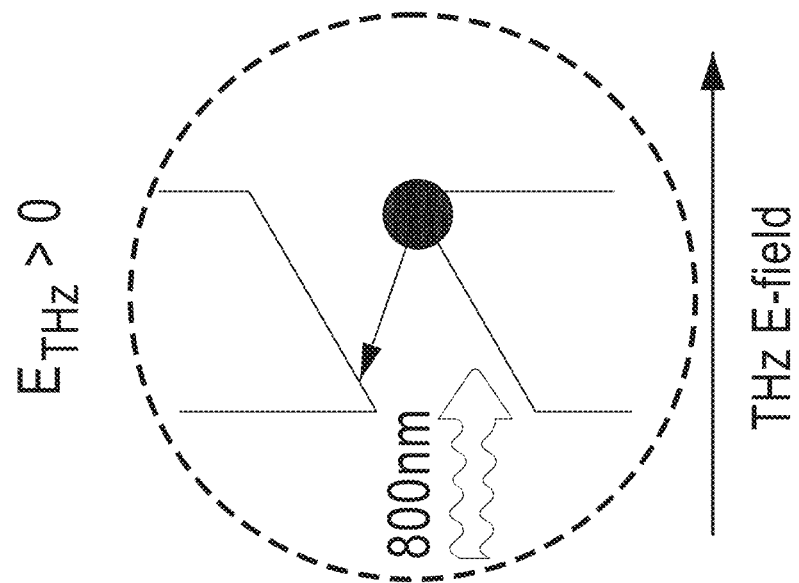
FIGS. 9A-9B illustrate the electro-absorption process of Terahertz (THz) radiation and the distortion of bandgap of EL materials due to electro-absorption.
Figure 9A:
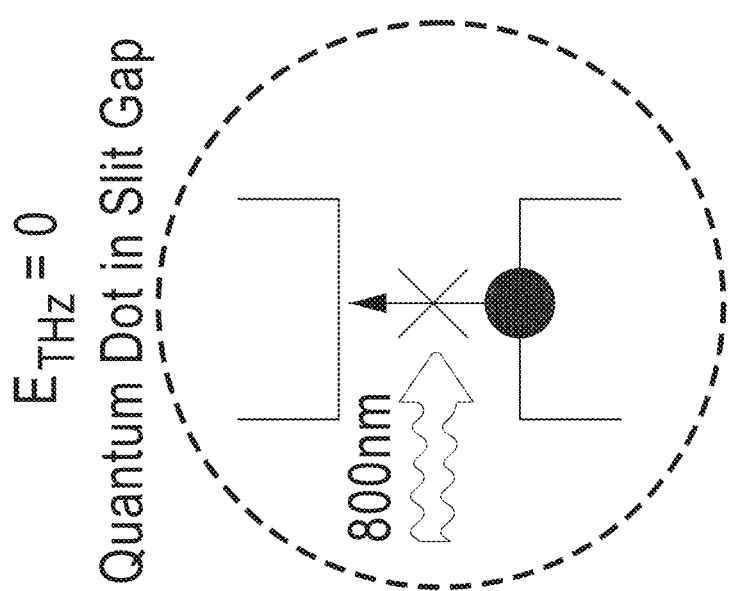
Figure 9D:
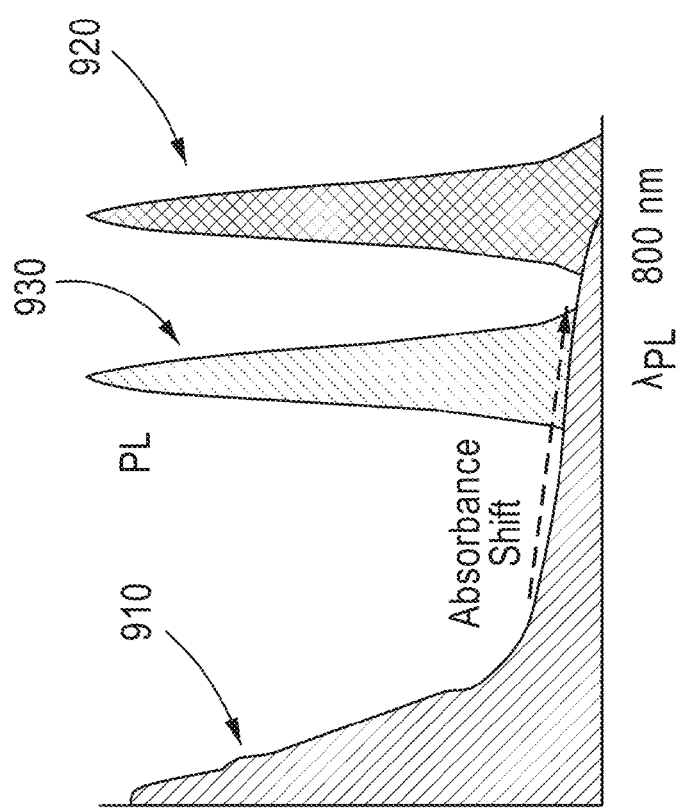
FIGS. 9C-9D illustrate photoluminescence of EL material due to the distortion of bandgap shown in FIGS. 9A-9B.
Figure 9C:
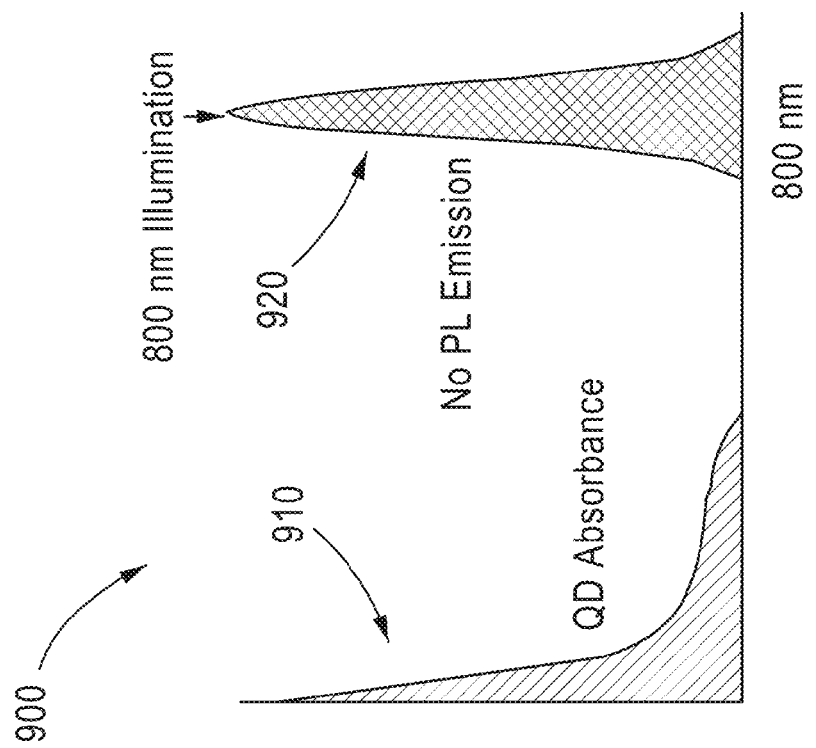

FIG. 9A-9D illustrate the electroabsorption process by an optical beam at 800 nm in quantum dots. FIG. 9A-9B show the energy diagrams of quantum dots when the optical beam is absent and present, respectively. FIG. 9C-9D show observed spectra from the quantum dots and the optical beam. In the case of the CdSe/CdS QDs used as the emissive layer 820, the 800 nm photon energy is below the band gap, so no luminescence is generated with this light alone. FIG. 9A shows that, in the absence of THz light, the band gap is greater than the photo energy so typically no transition occurs. FIG. 9C shows that the spectra include only the quantum dot absorption spectrum and the 800 nm incident optical beam.

When a THz pulse is coincident on the scintillator, the THz electric field distorts the ground-state and excited-state electronic potentials of the QDs through the electroabsorption process, resulting in a quantum-confined Stark shift of the band absorption edge all the way from about 550 nm to 800 nm, as shown in FIG. 9B. The THz-induced absorption of the 800-nm pulse allows generation of excitons that give rise to photoluminescence 930 as shown in FIG. 9D.

Figure 10:
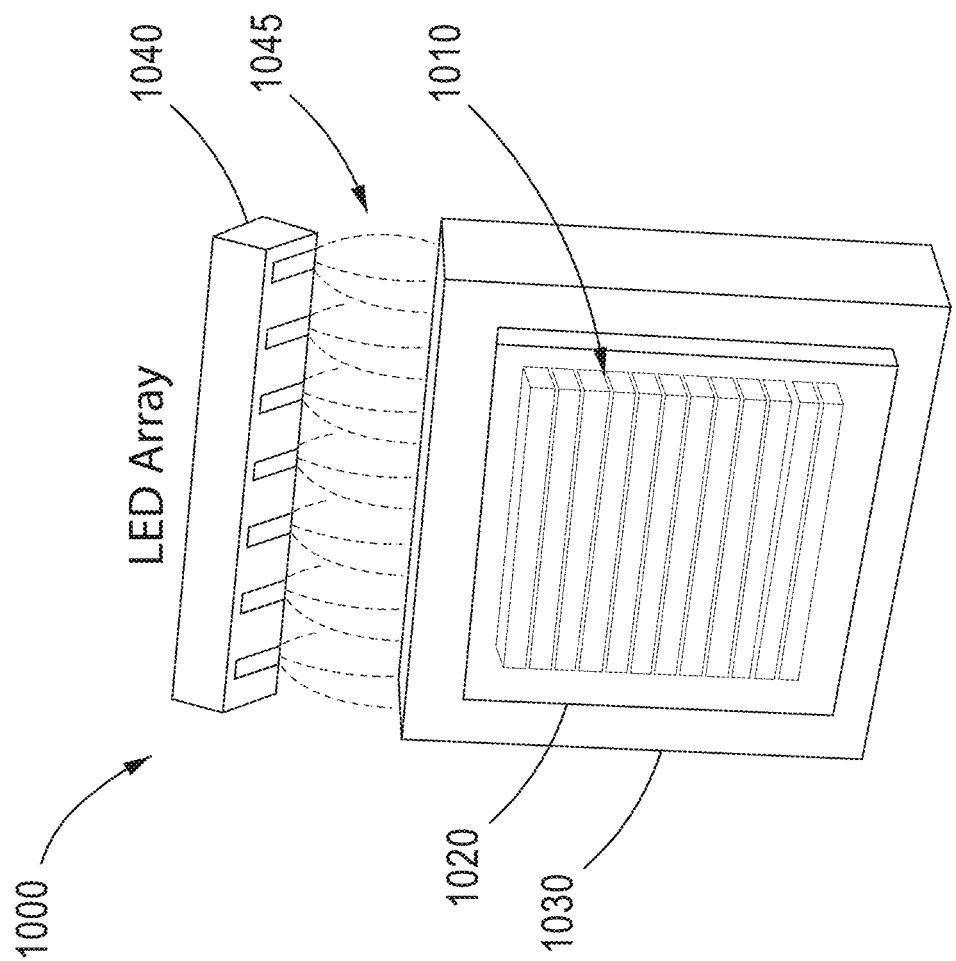
FIG. 10 shows a perspective view of a radiation scintillator using an array of light emitting diodes (LED) to enhance sensitivity.

FIG. 10 shows a schematic of an apparatus 1000 using optical beams 1045 to assist the THz detection. The apparatus 1000 includes afield-enhancing structure 1010 disposed on a substrate 1030. An emissive layer 1020 is disposed on the field-enhancing structure 1020 and fills any gaps defined by the field-enhancing structure 1020. A light emitting diode (LED) array 1040 is disposed in optical communication with the substrate 1030 to provide an array of optical beams 1045. The optical beams 1045 are propagating substantially parallel to the surface of the substrate 1030 to reduce potential interference with visible light created by the emissive layer 1020. The substrate 1030 can include waveguide structures to propagate the optical beams 1045 and increase the interaction time between the optical beams 1045 and the emissive layer 1020 so as to increase photoluminescence yield.

Systems of Radiation Detection Including Scintillators

Figure 11:
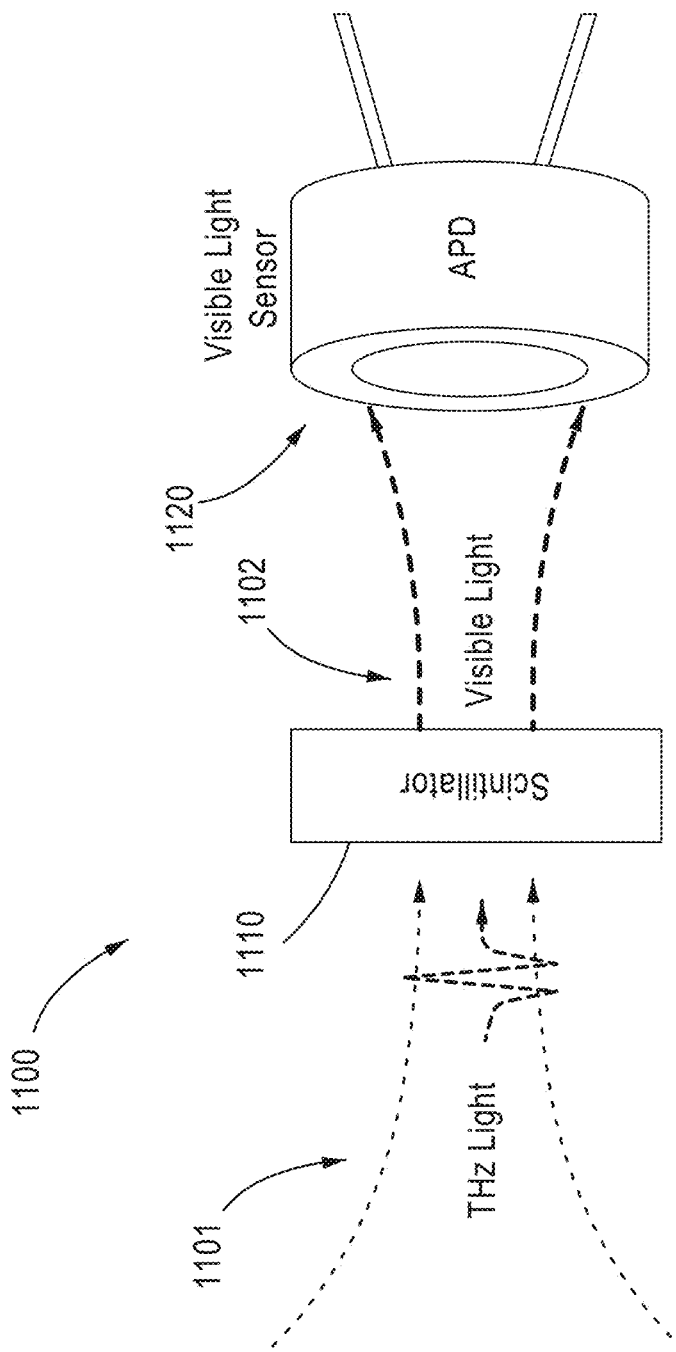
FIG. 11 shows a radiation detection system including a radiation scintillator.

Based on scintillators described above, various radiation detection systems can be constructed. FIG. 11 shows a schematic of a radiation detection system 1100 using THz scintillators. The system 1100 includes a scintillator 1110 to receive incident THz light 1101 and convert the otherwise invisible THz light 1101 into visible light 1102. A detector 1120 is disposed in optical communication with the scintillator 1110 to receive the visible light 1102, which represents presence (or absence) and/or properties of the incident THz light.

The scintillator 1110 can be any of the scintillators described above with reference to FIGS. 1-10. The detector 1120 can include various types of sensors, such as charge-coupled devices (CCDs), complementary metal-oxide semiconductor (CMOS detectors), photomultiplier tubes (PMT), and avalanche photodiodes (APDs), and Geiger-mode APDs (GM-APDs), among others. The detector 1120 can match the emission wavelength of the scintillator 1110. For example, when IR light is emitted by the scintillator 1110, an IR camera can be accordingly employed to detect the IR light.

The optical communication between the scintillator 1110 and the detector 1120 can be established by at least two approaches. In the first approach, the scintillator 1110 can be directly deposited on the detector 1120 (also referred to as direct integration). In the second approach, one or more relay optics can be used to transmit the visible light 1102 to the detector 1120 (also referred to as relay integration). The direct integration approach can have a higher light collection efficiency that allows incoming THz light to be imaged at high frame rate (e.g., 25 frames per second, the maximum frame rate of the some cameras). The relay integration approach can have a higher spatial resolution capable of resolving finer features such as features within individual split ring resonators.

Figure 12:
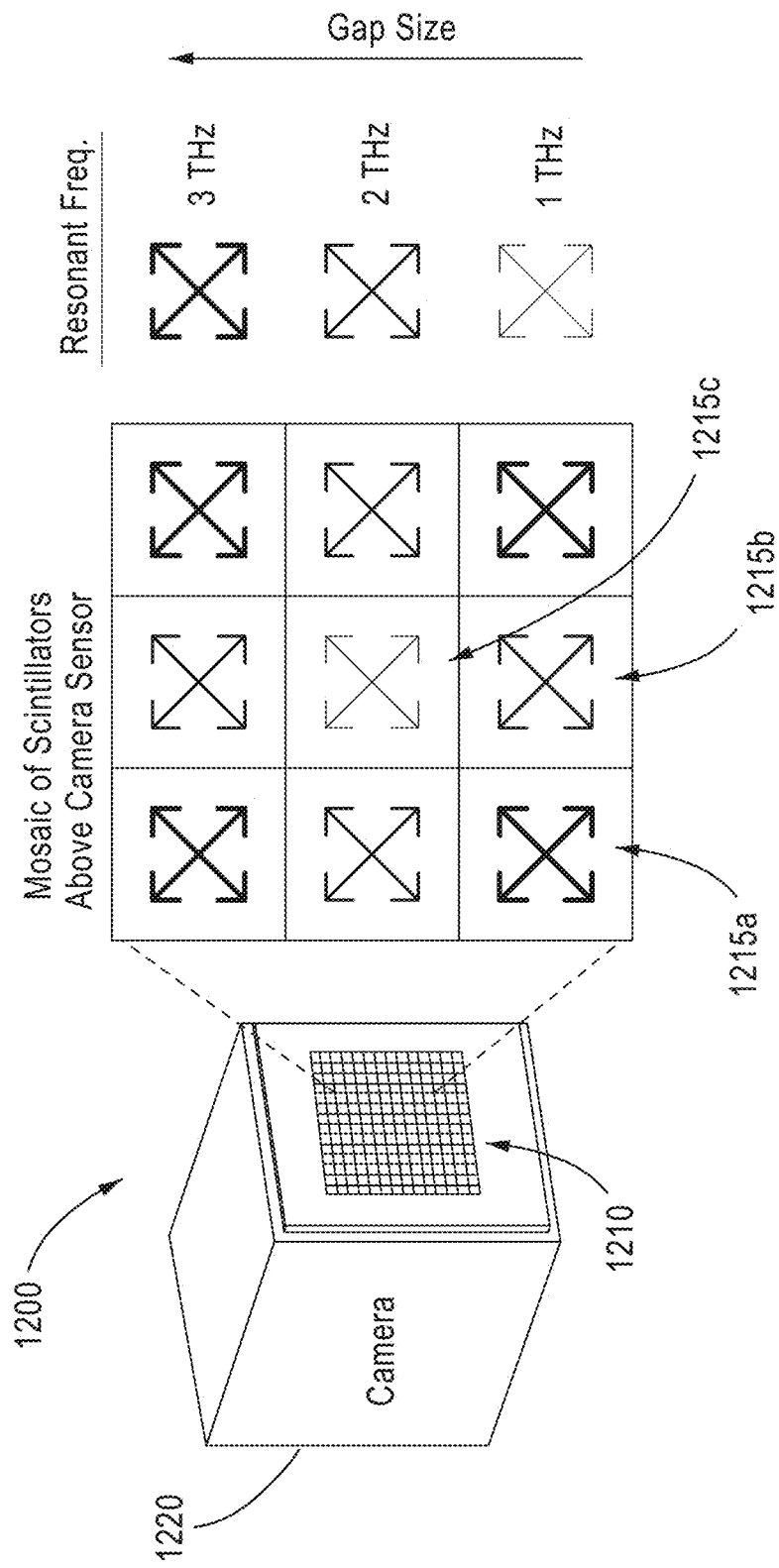
FIG. 12 shows a radiation detection system using a scintillator having a plurality of split ring resonators arrayed in a Bayer filter configuration.

FIG. 12 shows a schematic of a radiation detection system 1200 including a scintillator 1210 using split ring resonators 1215 as the field-enhancing structure. The scintillator 1210 is directly attached to a sensor 1220 (e.g., camera CCD). The scintillator 1210 includes an array of splint ring resonators (1215a, 1215b, and 1215c) arranged in a Bayer filter configuration. Split ring resonators with three different resonant frequencies are used. Each pixel in the camera detector 1220 has an individual SRR FES above it with a unique resonant frequency forming a THz frequency-resolved camera.

In this example, the split ring resonators 1215 in the scintillator 1210 fall into three categories. The first category 1215a resonates at 4 THz, the second category 1215b resonates at 2 THz, and the third category 1215c resonates at 1 THz. In the scintillator 1210 including nine split ring resonators, the third category 1215c is disposed in the center of the sensor 1220. The other eight splint ring resonators at the periphery surrounding the center resonator include alternating resonators of 1215a (first category) and 1215b (second category). In this configuration, the radiation detection system 1200 can resolve different "colors" of THz radiation, in a similar manner of color detection as in visible range by color sub-pixels in color detectors.

Figure 13:
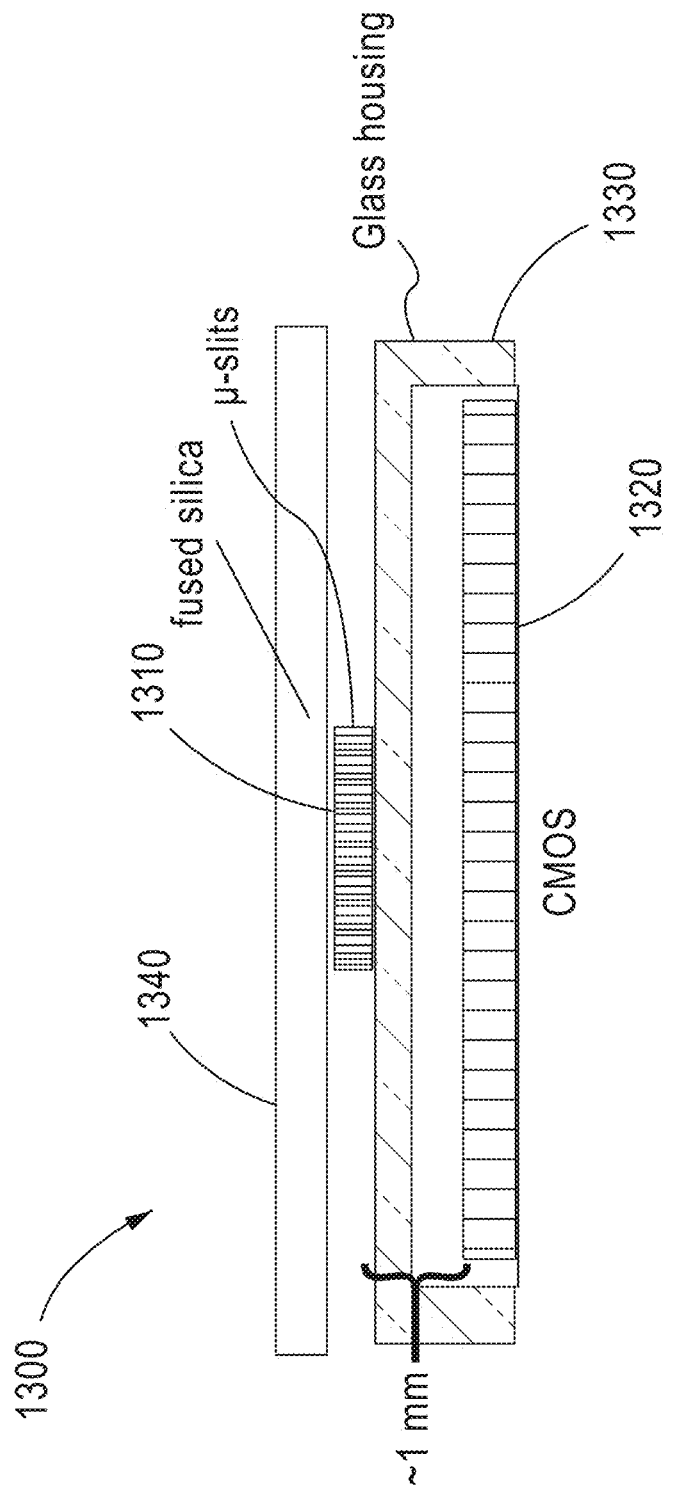
FIG. 13 shows a cross sectional view of a radiation detection system including a scintillator that uses micro-slits as an FES and is disposed on an imager.

FIG. 13 shows a cross sectional view of another radiation detection system 1300 using the direct integration approach. The system 1300 includes a scintillator 1310 directly deposited on a glass housing 1330 of a CMOS detector 1320. The scintillator 1310 includes an array of micro-slits as the field-enhancing structure. A fused silica layer 1340 is disposed on the scintillator 1310 to protect the scintillator 1310 from damage. Most commercially available CMOS cameras come with them a protection glass in front of the sensors and this protection glass can be used as the glass housing 1330 in the system 1300. The system 1300 allows convenient integration of scintillators into available cameras to construct cost-effective THz detection systems.

Figures 14A, 14B, 14C, 14D:
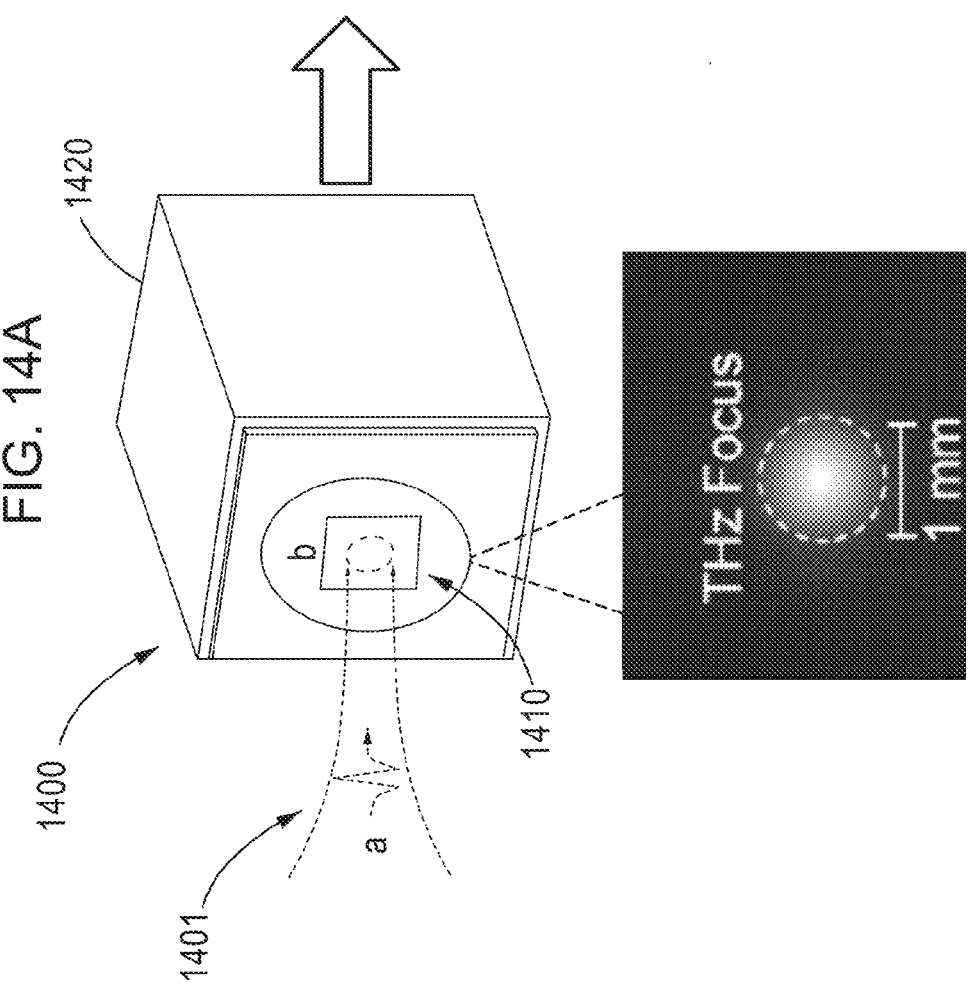
FIG. 14A shows a perspective view of a radiation detection system including a scintillator that uses micro-slits as an FES and is disposed on an imager.
FIG. 14B is a photo of the radiation detection system shown in FIG. 14A.
FIG. 14C shows the micro-slits used in the radiation detection system shown in FIG. 14A.
FIG. 14D is a photo of electroluminescence originating from quantum dots within the gaps of the micro-slit array.

FIG. 14A illustrates a perspective view of a third radiation detection system 1400 using the direct integration approach. The system 1400 includes a scintillator 1410, deposited on a camera detector 1420, to receive THz light 1401 and convert the THz light 1401 into visible light. The scintillator 1410 includes a micro-slit array. FIG. 14B is a photo taken in front of the system 1400, showing the scintillator 1410 and the detector 1420 behind the scintillator 1410. FIG. 14C shows the schematic of the micro-slit array. FIG. 14D shows an experimental image of electroluminescence originating from quantum dots within the gaps of the micro-slit array.

FIGS. 15A-15C shows a schematic of a radiation detection system 1500 using the relay integration approach. The system 1500 includes a scintillator 1510 to receive incident radiation 1501 and convert the incident radiation 1501 into visible light 1502. A pair of lenses 1530a and 1530b transmits the visible light 1502 from the scintillator 1510 to a detector 1520. The pair of lenses 1530a and 1530b can form a relay imaging optic to relay the image of the scintillator 1510 to the detector 1520. In this case, high resolution of radiation detection can be achieved. For example, FIG. 15B shows a schematic of the scintillator 1510 including an array of split ring resonators. FIG. 15C shows an experimental image, in which illustrations of four individual SRRs are overlaid to demonstrate that the visible light originates from the capacitive gaps. It can be seen from FIG. 15C that the experimental image can resolve features within individual SRR.

Figure 16B:
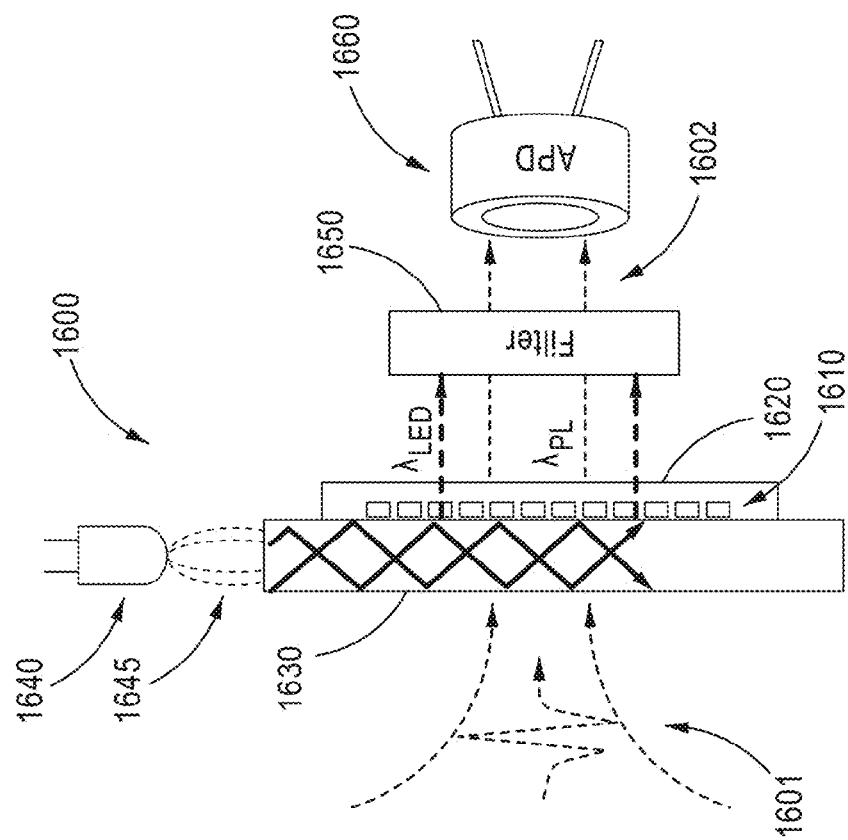
FIGS. 16A-16B illustrate radiation detection with an FES assisted by visible and near infrared light.
Figure 16A:
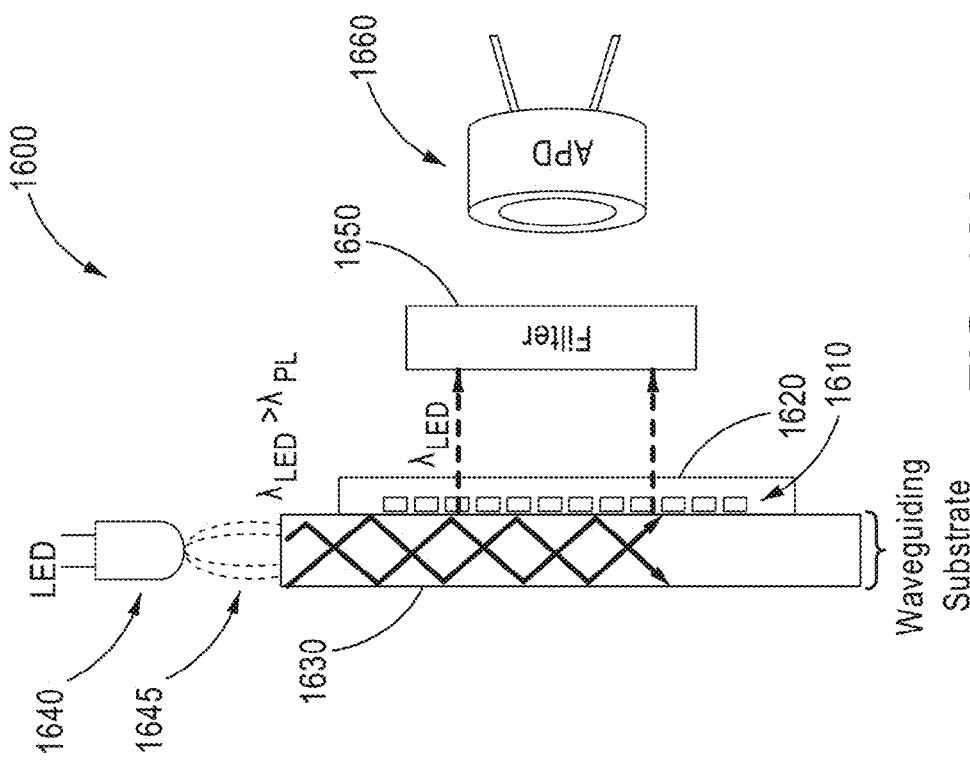

FIGS. 16A-16B illustrate a radiation detection system 1600 including optical beams to increase the sensitivity. FIG. 16A shows the system when THz radiation is absent and FIG. 16B shows the system when THz is detected. The system 1600 includes a field-enhancing structure 1610 sandwiched between a substrate 1630 and an emissive layer 1620 comprising an EL material. A light source 1640 is employed to provide optical beams 1645 that propagate substantially parallel to the substrate 1630 but can interact with the emissive layer 1620. The substrate 1630 can include a waveguide structure that guides the optical beams 1645. A detector 1660 is disposed toward the surface of the substrate 1630, i.e., the optical axis of the detector 1660 is substantially perpendicular to the propagation direction of the optical beams 1645. A filter 1650 is placed between the emissive layer 1620 and the detector 1660 to filter out the optical beams 1645.

The photon energy of the optical beams 1645 can be lower than the bandgap of the EL material in the emissive layer 1620. Therefore, in the absence of THz radiation 1601, the optical beams 1645 typically do not create photoluminescence in the emissive layer 1620. In addition, any diffuse or scattered light from the optical beams 1645 can be filtered out by the filter 1650. Therefore, the detector 1660 detects no signal when THz radiation 1601 is absent.

When THz light 1601 illuminates the field enhancing structure 1610, the electric field of the THz light 1601 distorts the energy diagram of the EL material in the emissive layer 1620 via electroabsorption such that the bandgap is lower than the photon energy of the optical beams 1645. In this case, the optical beams 1645 creates photoluminescence in the emissive layer 1620. The created visible light 1602 normally has a wavelength $\lambda_{PL}$ different from the wavelength $\lambda_{LED}$ of the optical beams 1645. Therefore, the visible light 1602 can pass through the filter 1650, which can be a narrowband filter transmissive at $\lambda_{PL}$ but absorptive or reflective at other wavelengths including $\lambda_{LED}$. The detector 1660 then picks up the visible light 1602 to detect the presence of the THz light 1601.

The radiation detection systems described herein can operate in several different modes. In on example, the radiation detection system can perform only threshold detection to detect either the presence or the absence of radiation at a target wavelength or within a target wavelength range. In this mode, observation of visible light by the detector can indicate the presence of target radiation. In another example, the radiation detection systems can perform amplitude detection to determine the strength of target radiation. In this mode, the intensity of the acquired visible light can be proportional to the strength of incident target radiation, but some calibration may be performed to determine the absolute intensity (or power) of incident radiation. In yet another example, the radiation detection system can perform frequency-resolved imaging and sensing, in which case the detection distinguishes not only different intensities of incident radiation but also difference wavelengths. As described above, using an array of split ring resonators tuned at different resonant frequencies can allow this spectroscopic detection.

Characterization of Radiation Detections Systems Including Scintillators

Figures 17A, 17B, 17C, 17D:
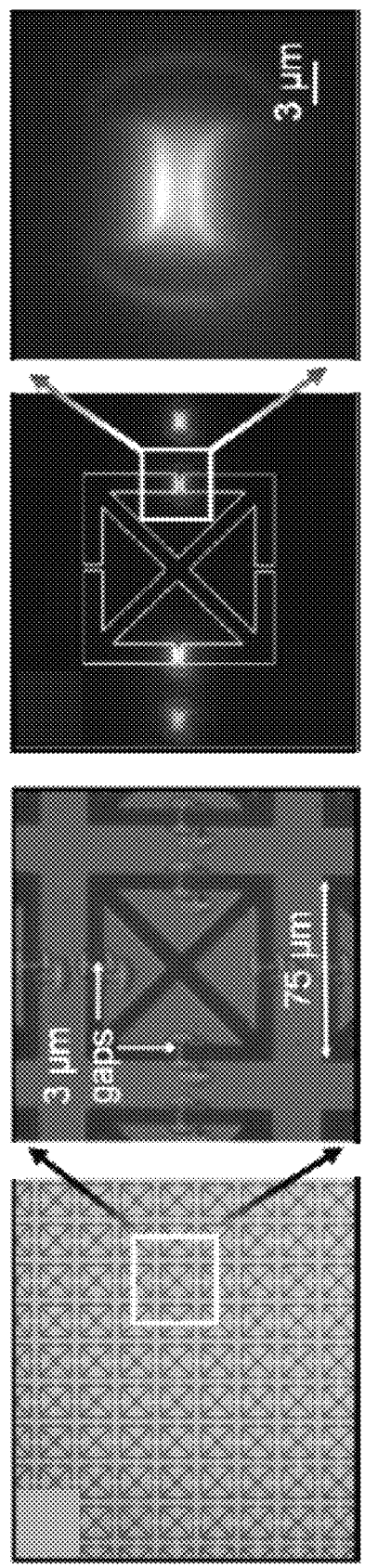
FIGS. 17A-17B are microscope images of scintillators made of split ring resonators.
FIGS. 17C-17D are microscope images of electroluminescence generated by the scintillators shown in FIGS. 17A-17B in response to THz radiation.

FIGS. 17A-17D are microscope images of scintillators made of split ring resonators fabricated by patterned deposition of gold, onto which an EL materials (Alq$_3$:DCM or CdSe/CdS QD) is deposited. FIG. 17A is a microscope image of the scintillator when THz is absent. FIG. 17B shows an enlarged view of an individual split ring resonator. The capacitive gaps are 3 μm wide and the SRR width is 75 μm. FIG. 17C is a microscope image of the scintillator when THz light is focused onto the SRRs. Electroluminescence is visible within the gaps. FIG. 17D shows the enlarged view of EL from a single gap.

FIGS. 18A-18D are microscope images of scintillators made of micro-slits. FIG. 18A shows the image of a 7×7 mm array of micro-slits. FIG. 18B shows the enlargement of some of the gold strips (also referred to as gold lines) and the gaps between them. The gaps are 1 μm wide and the line spacing is about 100 μm. FIG. 18C shows that when THz light is focused onto the micro-slits, electroluminescence is visible in the portion of the gaps within the THz focus which is about 1 mm in diameter. FIG. 18D shows the enlargement of EL from part of a single gap region. On the micron scale, the luminescence from SRR and micro-slits appears as rows of horizontal dots and horizontal bars respectively. In both cases the brightest luminescence is localized at upper and lower boundaries of each individual gap, where the THz field enhancement is the most pronounced.

The experimental observation of electroluminescence from the above scintillators are unexpected and surprising. For electroluminescence to occur, electrons and holes usually meet in the EL medium within the microns-wide capacitive gaps of the FESs. The electron mobility and hole mobility in quantum dots and organic EL materials are typically low. For Alq$_3$ and QD films, reported values can range from about $10^{-9}$ cm$^2$V$^{-1}$s$^{-1}$ to about 1 cm$^2$V$^{-1}$s$^{-1}$. An electric field oscillating at 1 THz can "switch" on and off in about 0.5 ps. Even at the high end of those values, it takes a field of about 100 MV/cm for an electron or hole to traverse 1 μm in ps. This field is far higher than the enhanced field levels (usually less than 10 MV/cm) in typical field-enhancing structures. Therefore, it is unexpected and surprising to observe electroluminescence at these parameters. One possible explanation can be attributed to nonlinear THz field effects that may occur in the gaps.

Figure 19C:
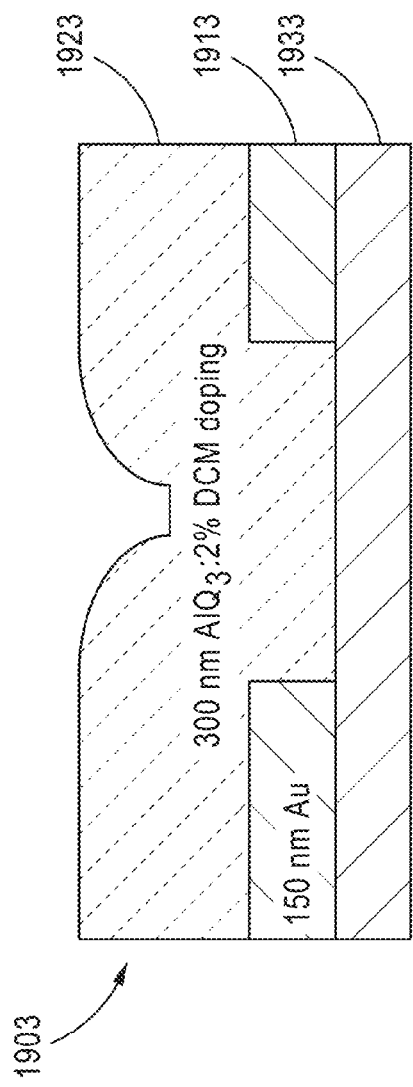
FIGS. 19C-19D show scintillators using $Alq_3$ doped with DCM as the EL material.

FIGS. 19A-19E show experimental results of four different micro-slit scintillators using an organic or QD emissive layers as well as an addition of a SiO$_2$ layer that insulates the micro-slits. FIG. 19A shows the schematic of the first scintillator 1901 including gold strips 1911 having a thickness of about 150 nm. The gold strips 1911 fine a slit having a width of about 1 μm. Only one gap is shown, but in practice the scintillator 1901 has multiple gaps arrayed at a periodicity of about 100 μm. An emissive layer 1921 made of CdSe/CdS core/shell quantum dots is disposed over the gold strips 1911 and the gap. A substrate 1931 is used to hold the gold strips 1911 and the emissive layer 1921.

FIG. 19B shows a second scintillator 1902 similar to the first scintillator 1901 except that a 30 nm thick layer of SiO$_2$ is used to suppress charge injection from the gold into the emissive layer. More specifically, the scintillator 1902 includes a substrate 1932 holding gold strips 1912 that define slits having a width of about 1 μm and a pitch of about 100 μm. A SiO$_2$ layer 1942 is conformally deposited onto the gold strips 1912 and sandwiched between an emissive layer 1922 and the gold strips 1912 for insulation.

FIG. 19C shows a third scintillator 1903 similar to the first scintillator 1901 except that the emissive layer is made of Alq$_3$ doped by 2% of DCM. More specifically, the scintillator 1903 includes an emissive layer 1923 disposed on gold strips 1913 that define slits having a width of about 1 μm and a pitch of about 100 μm. A substrate 1933 is disposed underneath the gold strips 1913 to provide mechanical support.

Figure 19D:
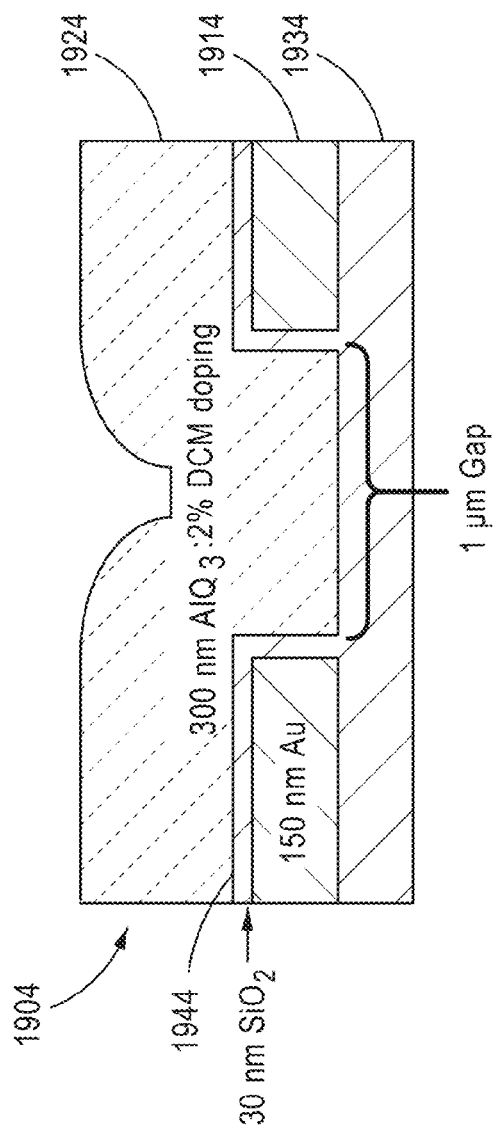

FIG. 19D shows a fourth scintillator 1904 similar to the third scintillator 1903 except that a 30 nm thick layer of SiO$_2$ is sued to separate the gold strips from the emissive layer. More specifically, the scintillator 1904 includes a SiO$_2$ layer 1944, which is sandwiched between gold strips 1914 disposed on a substrate 1934 and an emissive layer 1924. The emissive layer 1922 fills gaps defined by the gold strips 1914 and covers the top surfaces of the SiO$_2$ layer 1944.

Figure 19E:
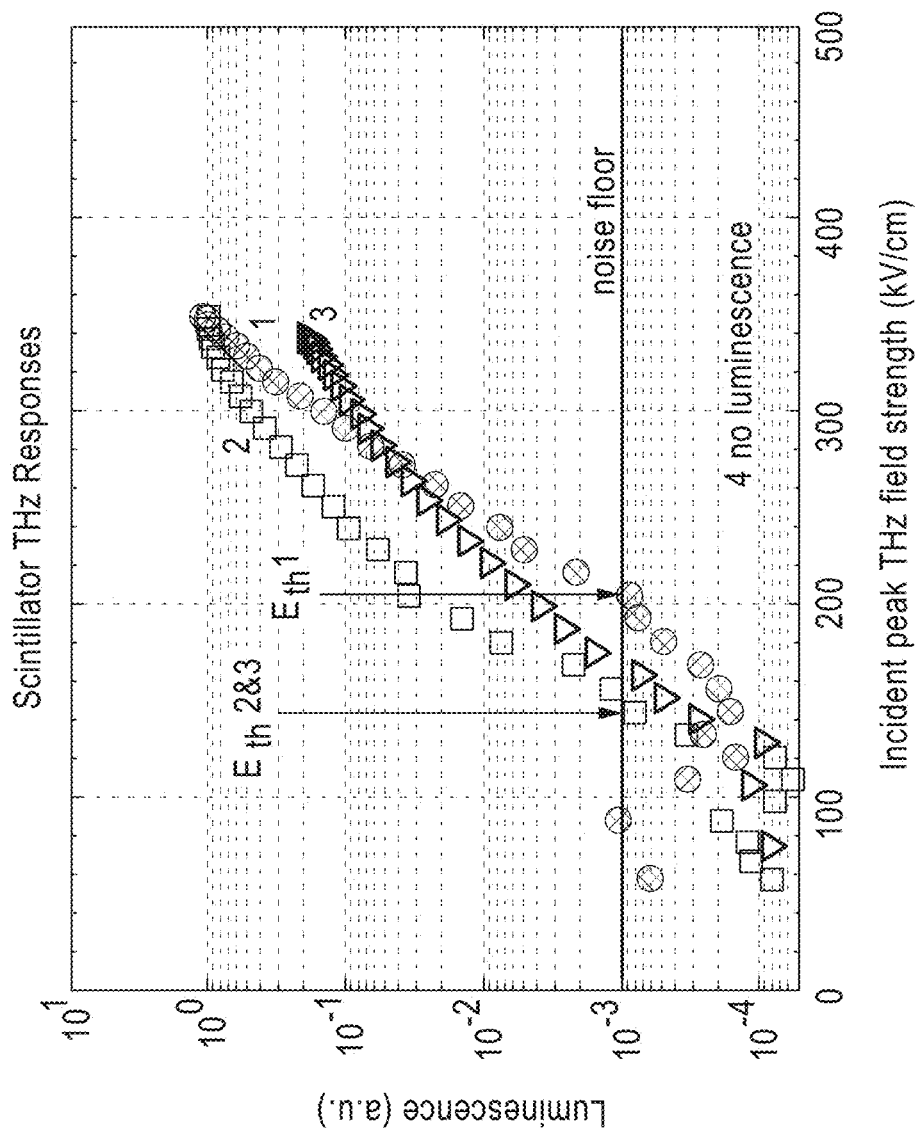
FIG. 19E shows electroluminescence intensity as a function of incident THz field strength for the four examples of scintillators shown in FIGS. 19A-19D.

FIG. 19E shows the scintillator THz responses for the four different device shown in FIGS. 19A-19D as a function of THz field strength. The THz-driven luminescent response is highly nonlinear with respect to the incident THz field strength and varies between the different designs. The degree of nonlinearity can depend on the scintillator design. One observation is that covering the micro-slits with a layer of insulating SiO$_2$ does not halt or reduce emission from the QD layer in the second scintillator, suggesting that the EL in this device is primarily field-driven and does not require charge injection from the gold. In fact, the luminescence yield is greater when the insulating layer is present. On the other hand, the organic emissive layer can benefit from physical contact with the gold in order for luminescence to occur (e.g., in the fourth scintillator). The threshold field strength ($E_{th}$), the minimum THz field that can cause luminescence above the noise floor, can also depend on the design.

Figure 20C:
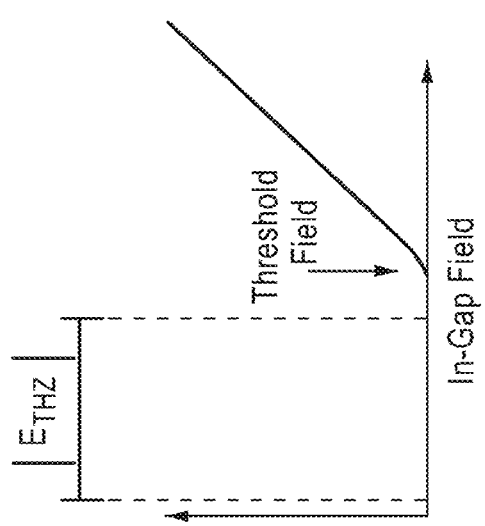

FIGS. 20A-20F show experimental results of scintillators with and without DC field assistance. FIG. 20A shows the schematic of a scintillator without DC field assistance. The scintillator 2000 includes an interdigitated micro-slit array 2010, in which a first half 2012a of the slits is connected to a first electrode 2040a and a second half 2012b of the slits is connected to a second electrode 2040b. However, neither the electrode 2040a nor the electrode 2040b is connected to a power source and therefore there is no DC field across the slits. FIG. 20B shows the schematic of the scintillator 2000 when a variable voltage source 2050 is connected to the electrodes 2040a and 2040b, creating a DC field across the slits.

Figure 20D:
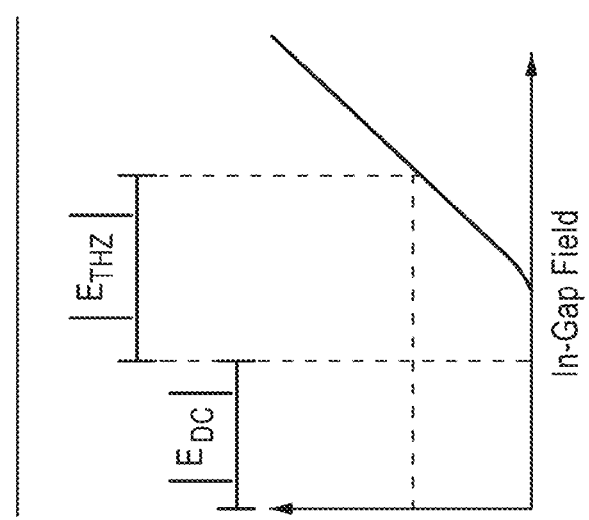

FIG. 20C shows the luminescence intensity as a function of in-gap field when DC field is not used as shown in FIG. 20A. Without a DC bias, the field within the slits is supplied by the enhanced THz field alone. FIG. 20D shows the luminescence intensity as a function of in-gap field when the DC field is applied as shown in FIG. 20B. In this case, an additional DC component to the in-gap field is introduced which substantially increases the luminescence output of the scintillator.

FIGS. 20E-20F show luminescent responses of scintillators using a CdSe/CdS QD emissive layer without and without DC assistance. Applying a 10, 20, and 30 V bias increases the EL intensity and reduces the threshold incident THz field strength required to generate luminescence. The threshold THz field can be decreased from about 130 kV/cm to as low as about 70 kV/cm.

Figure 21B:
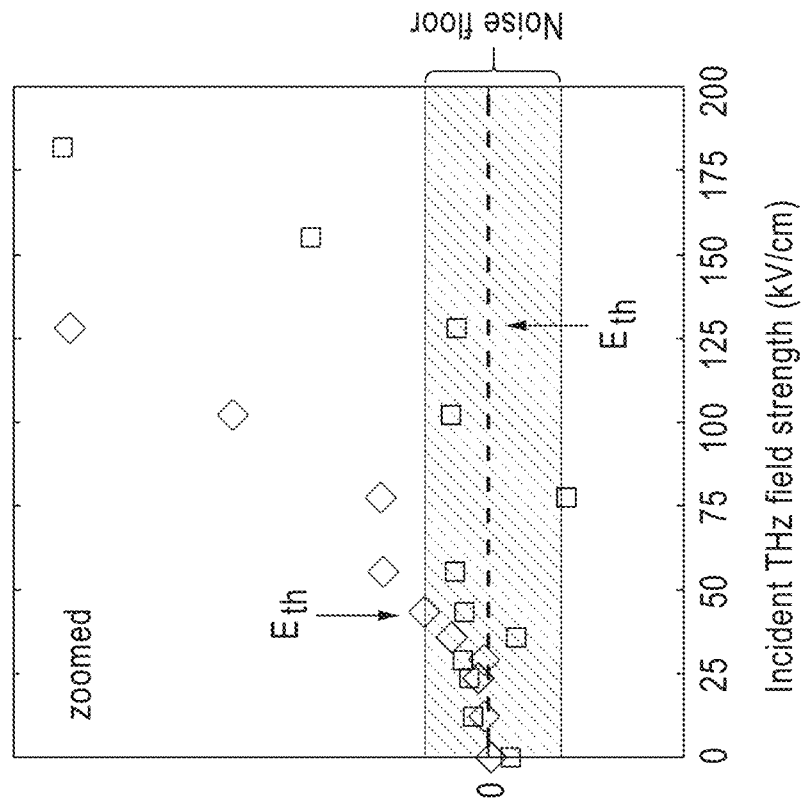
FIGS. 21A-21B show experimental results of radiation detection with and without assistance of near-infrared light.
Figure 21A:
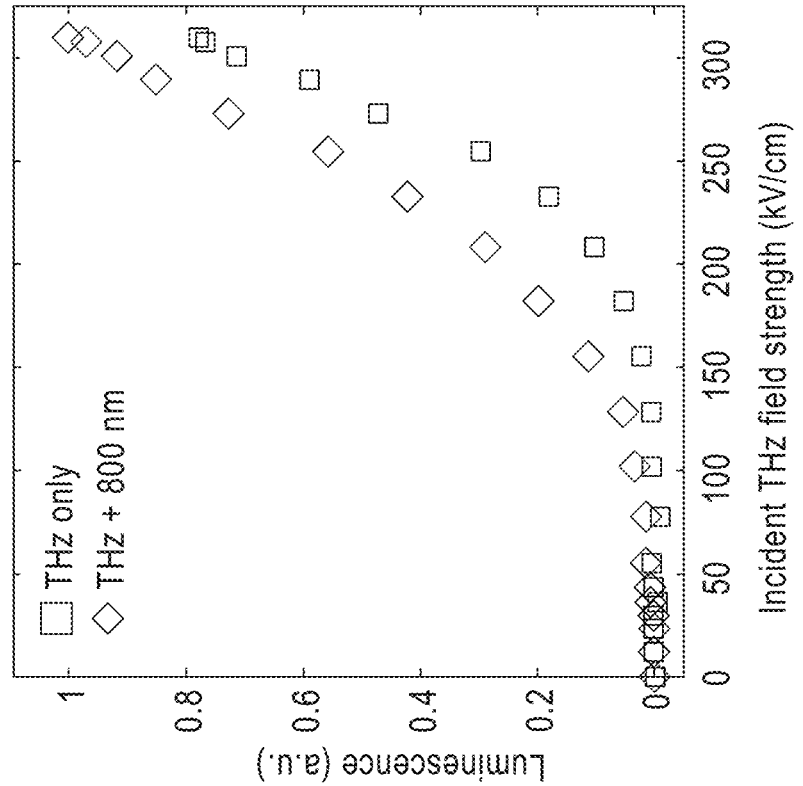

FIGS. 21A-21B show experimental results in which the addition of 800-nm pulses can reduce the minimum detectable THz field strength from about 100-150 kV/cm to about 30-40 kV/cm. The corresponding experimental setup is similar to the one shown in FIG. 8. Using illumination wavelengths shorter than 800 nm would further decrease the minimum detectable field.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for detecting electromagnetic radiation including a first spectral component having a first frequency within a range of about 100 GHz to about 100 THz, the apparatus comprising:
   a conductive structure defining a first gap to receive and trap the electromagnetic radiation so as to generate an enhanced electric field in response to the first spectral component;
   an electroluminescent (EL) material disposed at least partially within the first gap to emit light in response to the enhanced electric field; and
   a silicon oxide layer, disposed between the conductive structure and the EL material, to electrically insulate the conductive structure from the EL material.

2. The apparatus of claim 1, wherein the conductive structure comprises a split ring resonator.

3. The apparatus of claim 2, wherein the split ring resonator is a first split ring resonator having a first resonant frequency and further comprising a second split ring resonator having a second resonant frequency different than the first resonant frequency.

4. The apparatus of claim 3, wherein the first resonant frequency and the second resonant frequency are with the range of about 100 GHz to about 100 THz.

5. The apparatus of claim 1, wherein the conductive structure comprises two conductive strips and the first gap comprises a first micro-slit defined by the two conductive strips, the first micro-slit having a width of about 0.1 µm to about 10 µm.

6. The apparatus of claim 5, wherein a first conductive strip in the two conductive strips is electrically coupled to a first electrode and a second conductive strip in the two conductive strips is electrically coupled to a second electrode to generate a direct current (DC) electric field across the first micro-slit.

7. The apparatus of claim 1, wherein the conductive structure comprises a plurality of interdigitated conductive strips defining a plurality of micro-slits.

8. The apparatus of claim 7, wherein a first plurality of conductive strips in the plurality of interdigitated conductive strips is electrically coupled to a first electrode and a second plurality of conductive strips in the plurality of interdigitated conductive strips is electrically coupled to a second electrode so as to generate a direct current (DC) electric field in the plurality of micro-slits.

9. The apparatus of claim 1, wherein the EL material is configured to emit visible light.

10. The apparatus of claim 1, wherein the EL material is configured to emit infrared light.

11. The apparatus of claim 1, wherein the EL material comprises Tris(8-hydroxyquinolinato)aluminium ($Alq_3$).

12. The apparatus of claim 1, wherein the EL material comprises Tris(8-hydroxyquinolinato)aluminium ($Alq_3$) doped with 4-(dicyanomethylene)-2-methyl-6-(p-dimethylaminostyryl)-4H-pyran.

13. The apparatus of claim 1, wherein the EL material comprises at least one quantum dot.

14. The apparatus of claim 1, further comprising:
a detector, in optical communication with the EL material, to detect the light emitted by the EL material.

15. The apparatus of claim 14, wherein the detector comprises at least one of an avalanche photodiode and an intensified charge-coupled-device.

16. The apparatus of claim 14, wherein the at least one conductive structure is disposed on the detector.

17. The apparatus of claim 14, further comprising:
a relay optic, in optical communication with the EL material and the detector, to transmit the light emitted by the EL material onto the detector.

18. An apparatus for detecting electromagnetic radiation including a first spectral component having a first frequency within a range of about 100 GHz to about 100 THz, the apparatus comprising:
a conductive structure defining a first gap to receive and trap the electromagnetic radiation and generate an enhanced electric field in response to the first spectral component;
an electroluminescent (EL) material disposed at least partially within the first gap to emit light in response to the enhanced electric field; and
a light source in optical communication with the EL material and configured to illuminate the EL material with a beam of light having a photon energy below a band gap of the EL material so as to increase a sensitivity of the apparatus to the first spectral component.

19. A method of detecting electromagnetic radiation including a first spectral component having a first frequency within a range of about 100 GHz to about 100 THz, the method comprising:
illuminating a field-enhancing structure (FES) with the electromagnetic radiation to trap the electromagnetic radiation in a gap defined by the FES and generate an enhanced electric field at the FES in response to the first spectral component so as to cause an electroluminescent (EL) material, electromagnetically coupled to the FES, to emit light in response to the enhanced electric field;
detecting the light emitted by the EL material; and
illuminating the EL material with a light beam having a photon energy below a band gap of the EL material so as to increase a sensitivity of the FES.

20. The method of claim 19, wherein illuminating the FES comprises illuminating a micro-slit defined by at least two conductive strips.

21. The method of claim 20, further comprising:
applying a direct current (DC) electric field across the micro-slit to increase a sensitivity of the apparatus.

22. The method of claim 19, wherein illuminating the FES comprises illuminating a split ring resonator.

23. The method of claim 19, wherein the EL material is configured to emit visible light.

24. The method of claim 19, wherein the EL material is configured to emit infrared light.

25. The method of claim 19, wherein the FES is deposited on a detector and wherein detecting the light comprises detecting the light with the detector.

26. The method of claim 19, wherein detecting the light comprises:
transmitting the light through a lens; and
detecting the light transmitted through the lens using a detector.

* * * * *